(12) United States Patent
Andre

(10) Patent No.: US 7,191,271 B2
(45) Date of Patent: Mar. 13, 2007

(54) TWO LEVEL MULTI-TIER SYSTEM BUS

(75) Inventor: Gregory S. Andre, Oviedo, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 293 days.

(21) Appl. No.: 09/955,961

(22) Filed: Sep. 20, 2001

(65) Prior Publication Data

US 2003/0135678 A1 Jul. 17, 2003

(51) Int. Cl.
*G06F 13/368* (2006.01)
*G06F 1/04* (2006.01)

(52) U.S. Cl. .................. 710/119; 710/309; 710/310

(58) Field of Classification Search ........... 710/243, 710/107, 6, 302, 52; 711/122, 141; 348/164; 700/97; 370/414, 389; 712/35
See application file for complete search history.

(56) References Cited

U.S. PATENT DOCUMENTS

| | | | |
|---|---|---|---|
| 4,612,653 A | | 9/1986 | Livingston et al. |
| 5,193,163 A | * | 3/1993 | Sanders et al. ............. 711/122 |
| 5,502,718 A | * | 3/1996 | Lane et al. ................. 370/414 |
| 5,524,216 A | * | 6/1996 | Chan et al. ................. 710/107 |
| 5,555,430 A | | 9/1996 | Gephardt et al. |
| 5,761,526 A | * | 6/1998 | Sakakura et al. ............. 710/1 |
| 5,890,217 A | * | 3/1999 | Kabemoto et al. .......... 711/141 |
| 5,990,939 A | * | 11/1999 | Sand et al. ................. 348/164 |

(Continued)

FOREIGN PATENT DOCUMENTS

| | | | |
|---|---|---|---|
| JP | 08272756 A | * | 10/1996 |
| JP | 09022380 A | * | 1/1997 |
| JP | 09153009 A | * | 6/1997 |

OTHER PUBLICATIONS

Tom Shanley / Don Anderson, PCI System Architecture, 1995, Mind Share, Inc. 3rd Ed., pp. 39-43 and 77-88.*

*Primary Examiner*—Rehana Perveen
*Assistant Examiner*—Christopher E. Lee
(74) *Attorney, Agent, or Firm*—Buchanan Ingersoll & Rooney PC

(57) ABSTRACT

The present invention is directed to a method and apparatus utilizing a two-level, multi-tier system bus. The multi-tier system bus of the present invention allows for the flow of information to be managed among plural processors by connecting processors within modules on a local bus, which is then connected to the system bus by way of a gateway. A system controller and arbitrator is provided for arbitrating access to the system bus by the various modules. The present invention, by way of the system controller initiates and performs control actions and allows the system bus to be freed from transmission delays of prior approaches associated with transmitting data packets. The present invention accomplishes this by establishing a clear path segment between various modules or devices contained on the system bus, and processors contained within modules located on local buses such that delays associated with transmission of such data packets is greatly reduced, and processing speeds and rates are greatly increased. The present invention also avoids the complications of software arbitration, as all of the arbitration of the present invention is accomplished by hardware.

31 Claims, 13 Drawing Sheets

U.S. PATENT DOCUMENTS

| | | | |
|---|---|---|---|
| 6,041,400 A * | 3/2000 | Ozcelik et al. | 712/35 |
| 6,138,176 A * | 10/2000 | McDonald et al. | 710/6 |
| 6,195,593 B1 * | 2/2001 | Nguyen | 700/97 |
| 6,327,625 B1 | 12/2001 | Wang et al. | |
| 6,609,167 B1 | 8/2003 | Bastiani et al. | |
| 6,704,310 B1 * | 3/2004 | Zimmermann et al. | 370/389 |
| 6,718,413 B1 | 4/2004 | Wilson et al. | |
| 6,772,263 B1 * | 8/2004 | Arramreddy | 710/302 |
| 6,842,800 B2 * | 1/2005 | Dupont | 710/52 |
| 2003/0051077 A1 | 3/2003 | Fengler | |
| 2003/0161391 A1 | 8/2003 | Andre et al. | |

* cited by examiner

TWO LEVEL MULTI-TIER SYSTEM BUS

BACKGROUND OF THE INVENTION

1. Field of the Invention

The present invention relates generally to bus systems for transferring information, such as data and control actions, between multiple processors. More particularly, the present invention relates to a high performance computer bus system for interconnecting plural processors in situations where size constraints of the overall system are an issue.

2. Background Information

Bus systems for interconnecting plural processors are known. For example, it is known to interconnect an array of processors to perform real time image processing, wherein a live video stream is processed in real time to identify specific features within the continuously changing image. A parallel processing array has been used for pipelining the data stream, wherein the processors are interconnected using any of a variety of bus systems, including, bus systems available on VME form factor cards. A fundamental operating principal of conventional bus systems, however, is to permit a very large number of processors to be connected with the bus.

However, conventional array bus systems, like those found in the VME world, tend to be more complex and difficult to implement in small specialized embedded systems. These complexities include interconnection schemes, compatibility issues, data routing, and control methods. Interconnection schemes such as crossbar interconnect require additional wiring needed to support multiple parallel paths. Compatibility and performance issues drive the need for more electronics such as those required to provide additional interfaces for the VME bus and other conventional interfaces found in VME subsystems. Data routing methods used are more prone to momentarily lock out path segments that may prevent some of the processors from receiving messages in the required time. Control methods utilize the VME bus for interfacing to the array which adds overhead. While these types of systems may work well in larger applications they have too much overhead and are therefore not practical for specialized embedded array processor systems. Embedded Systems must maximize performance in a small space (i.e., MIPS per unit Volume) as well as to minimize power consumption. Real time response is also critical in embedded arrays and control functions must be tightly integrated into their design.

In addition, the use of a VME Form Factor is unsuitable where space constraints are a significant factor. For example, when image processing is to be performed on board a manned or unmanned vehicle, efficient use of space becomes a significant constraint. Accordingly, it would be desirable to provide a bus system which can be implemented in a space efficient manner, and which can operate efficiently to optimize data and control action throughput.

SUMMARY OF THE INVENTION

The present invention is directed to providing a bus system that can be implemented in a relatively small amount of space, and that can operate in a highly efficient, high performance manner. Exemplary embodiments are implemented using a SEM E form factor, which is a standard form factor for circuit boards that is substantially smaller than the VME form factor. To satisfy the size constraints of the SEM E form factor, exemplary embodiments implement a parallel array processing system wherein many of the software functions previously performed by the various processors of a processing array are performed within the hardware of the bus system architecture thereby freeing up the processors. Exemplary embodiments implement this additional hardware functionality within the bus system such that the bus can take on increased responsibility of the overall processor array, while improving the overall bus performance. Significant advantages realized in accordance with the present invention can be achieved by implementing selected control actions, previously performed as software functionality within each processor using bus hardware functionality. In addition, a multi-tier bus system is used, with a multiple arbitrator scheme that optimizes bus efficiency. In accordance with exemplary embodiments, specific control actions implemented in the bus hardware have been developed, along with a protocol whereby clear (i.e., not busy) path segments are identified before any information is sent over the segment. Such a feature avoids attempts to transfer information over portions of the bus which are busy, or to processors which are unable to respond at that point in time to the information.

Generally speaking, exemplary embodiments of the present invention are directed to a method and apparatus for managing flow of information (i.e., data and control actions) among plural processors of a processing array, comprising: a system bus for interconnecting at least two processors; and means for arbitrating access to at least a first portion (e.g., a local bus, or a secondary bus for interconnecting the local buses) of a system bus among said at least two processors to transfer information over said first portion, said information being transferred using a protocol by which a system bus performs control actions for at least one of said processors independently of said at least one processor. For example, exemplary embodiments use system bus hardware to initiate and perform control actions previously performed by software included in the various processors of an array. This frees the processor from being involved in the control action and avoids the potential for the processor from being unable to respond to the control action initiated over the bus. To provide this ability, a number of control actions have been developed in accordance with exemplary embodiments of the present invention as part of the bus hardware.

Exemplary embodiments of the present invention are also directed to a method and apparatus for arbitrating the flow of information (data and control actions) among plural processors of a processing array, comprising: a system bus for interconnecting at least two processors; and means for arbitrating access to at least a first portion (e.g., a local bus or a secondary bus for interconnecting plural local buses) of said system bus among said at least two processors by establishing a clear (i.e., not busy) path segment from at least one of said processors to a predetermined point within said system bus, such as a gateway located within said system bus and developed in accordance with exemplary embodiments of the present invention.

BRIEF DESCRIPTION OF THE DRAWINGS

Other objects and advantages of the present invention will become more apparent to those skilled in the art upon reading the detailed description of the preferred embodiments, wherein like elements have been designated by like numerals, and wherein.

DETAILED DESCRIPTION OF THE PREFERRED EMBODIMENTS

Figure 1:
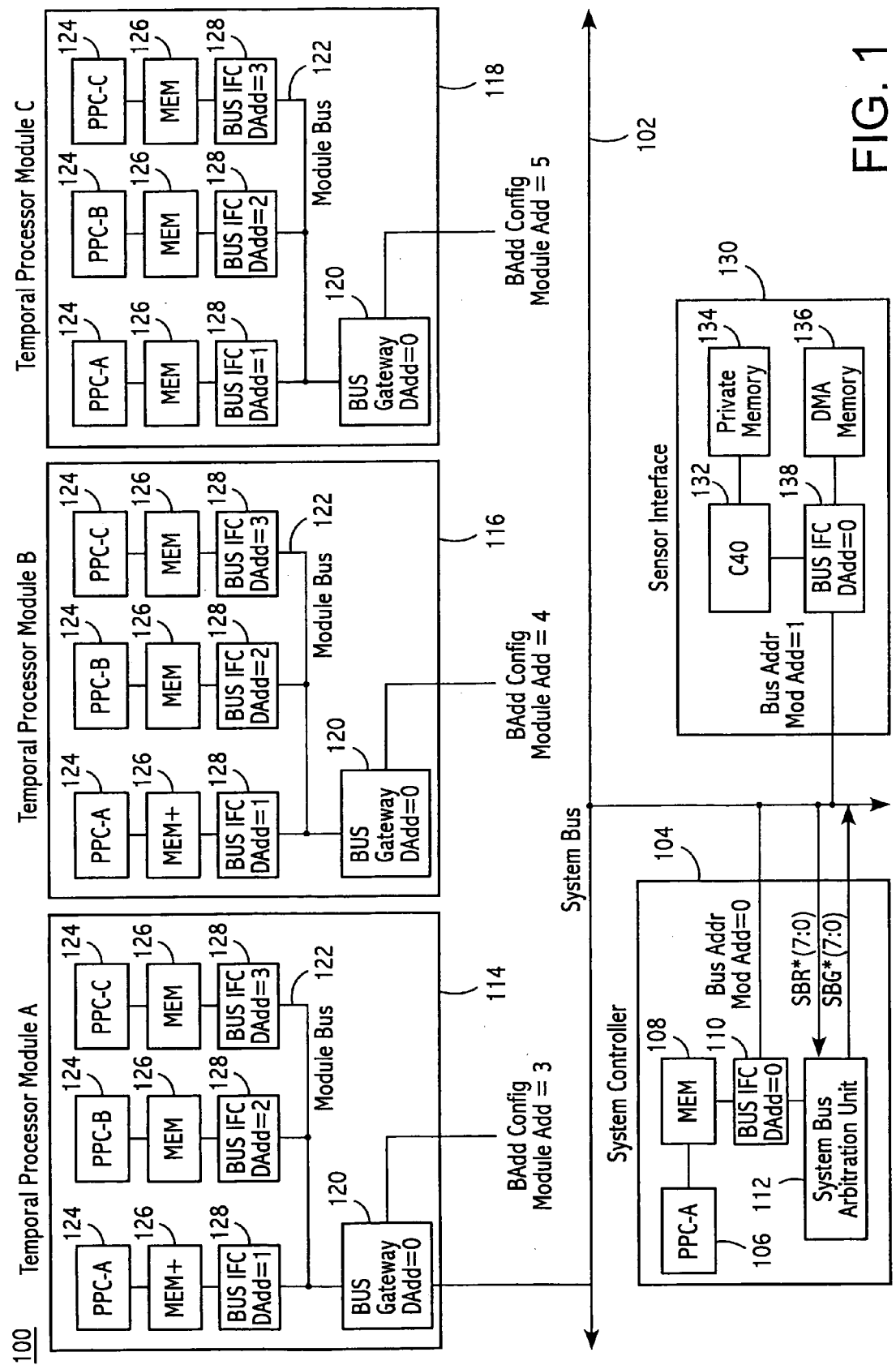
FIG. 1 is a block diagram of a general processor system bus architecture for connecting processor subsystems according to an exemplary embodiment of the present invention.

To facilitate an understanding of the principles and features of the present invention, it is explained hereinafter with reference to the exemplary embodiment of FIG. 1, wherein an exemplary apparatus for managing the flow of information among plural processors of a processing array is represented by a processor system bus architecture 100. In the processor system bus architecture 100, a system bus 102 is used to interconnect multiple processors. Access to the system bus 102 is controlled by a means for arbitrating access, or the system controller 104. The system controller 104 contains a Power PC (PPC) processor 106 designated PPC-A and transfers system bus control actions over the system bus 102 using a transfer protocol, described hereinafter with greater detail. The Power PC processor 106 is connected to memory 108 and a bus interface device 110, which is connected directly to the system bus 102. Also contained within the system controller 104 is a system bus arbitration unit 112, which is connected directly to the system bus 102 for controlling access to the system bus 102 by various devices connected thereto. This access is arbitrated independently of the processors connected by the system bus 102.

The system bus is connected to various temporal processor (TP) modules, designated temporal processor module A 114, temporal processor module B 116, and temporal processor module C 118. The system bus is connected to each temporal processor via individual bus gateway components 120 contained within each of the temporal processor modules. More temporal processor modules may be used in accordance with the present invention and connected to the system bus 102. However, for the sake of convenience, only three are shown. Similar components are contained within each of the temporal processor modules 114, 116, and 118 and these modules will be treated as identical for the sake of simplicity. However, the components contained within each of the temporal processor modules 114, 116, 118, and any additional temporal processor modules connected to the system bus 102 may be varied, and need not be identical.

The temporal processor modules 114, 116, and 118 each contain a local bus 122, or module bus, which connects various components on individual branches of the module bus through the bus gateway device 120 to the system bus 102. These components contained on each branch of the module bus are referred to as a node. Each node contains a processor 124, memory device 126 and a bus interface device 128. Each node, on each branch of the module bus 122, can be considered identical for the sake of convenience. However, it should be recognized that various combinations of components could be used within each node. For example, each node of each temporal processor module is shown as using a Power PC-type processor. However, any other type of processor could be used in its place. For example, a geometric arithmetic parallel processor (GAPP), available from Teranex, Inc. of Florida, could be used instead of a Power PC processor, or any suitable processor could be used.

In addition to the system controller 104 and the temporal processor modules 114, 116, and 118, a sensor interface 130 can also be connected to the system bus 102. This sensor interface 130 is an interface between the system processors 106, 124, and the outside world. The sensor can, for example, be a video sensing device, or a more sophisticated imaging device such as a forward looking infrared display device (FLIR), for example. It should also be recognized that a different type of sensor interface, other than a video or infrared device, can be attached to the system bus 102, and benefit from the processor system bus architecture 100 of the present invention. A digital signal processor 132, in this case a C40 processor from Texas Instruments, is used to process digital signals received by the sensor interface 130. It should be recognized, however, that the processor 132 need not be limited to a particular type, such as the C40 processor. Rather, the processor 132 of the sensor interface 130 can comprise any one or more of a variety of different types of processors suitable to perform digital signal processing, according to the task to be performed by the sensor interface, such as a Power PC processor. Also contained within the sensor interface 130 is a private memory device 134, and a direct memory access memory device 136. The elements contained within the sensor interface 130 are connected to the system bus by way of a bus interface device 138, similar to the bus interface devices 128, 110 within each of the temporal processor modules 114, 116, 118, and the system controller 104.

In one embodiment of the present invention, the sensor interface 130 of the processor system bus architecture 100 can be connected via the DMA memory device 136, to external spatial processors (SP). These spatial processors (which are not shown in FIG. 1) can include, for example, the GAPP processor, or other similar spatial processors, for filtering and rendering video signals. Such spatial processors are advantageous because they identify the subject of interest within the non-essential spaces within each frame of video, and output only information about the subject of interest in the video signal. The temporal processor modules 114, 116, and 118, configured to temporally analyze digital signals to recognize elements that are changing temporally, or, in the case of video signals, moving from one frame to the next. This type of temporal analysis allows one to recognize movement in subjects, such as vehicles or projectiles, for example, and is accomplished by way of temporal processing modules 114, 116, and 118.

The processor system bus architecture 100 shown in FIG. 1 is advantageous in that it uses the system bus arbitration unit 112 to control communication on the system bus 102 in a manner such that packet oriented communications between arrays of processors can be directed to the processing modules in which they can be handled in the most expedited and efficient manner. This bus architecture 100 can be expanded, including more temporal processor modules, for example, or allowing for the sensor interface to be additionally connected to external devices, such as additional memory, or a spatial filter, for example. Additionally, a bulk memory module can be connected to the system bus 102 to allow for increased memory storage capacity.

The bus architecture system 100 shown in FIG. 1 is a multi-tier bus system in that it comprises a main, system bus 102, and local, module buses 122 contained within temporal processor modules 114, 116, 118, connected by way of interface devices 128 to individual processors 124. The system bus 102 is the primary control and data path of the processor subsystem, and carries signals regarding the major functions of the subsystem. This system utilizes a transmit only philosophy to handle transfers across multiple bus segments and to optimize transfer rates. In one exemplary embodiment of the present invention, packets of 64 bits are used in a packet transmit only communications scheme. In such an embodiment, each system and module bus is capable of a sustained transfer of 128 Megabytes per second (Mb/s) from a single requesting master, and 106 Mb/s from multiple interleaved requesting masters. It will be recognized by those skilled in the art, however, that the number of bits per packet and the transfer rate of the bus architecture system 100 used by the present invention will change as processor speeds increase, and limits in semiconductor technology are overcome.

In a 64 bit packet oriented bus architecture system, packets to be transmitted over the system bus are formatted with a header word and one or four data words. All bus operations are based on a transmit philosophy, whereby a packet is launched from a starting point, passed through a local bus according to arbitration rules, and connected to other buses via gateways until it reaches the destination encoded in its address. The path, or channel, that the packet follows is not held open once the packet is transmitted to the next segment of the bus, such that it can be used for the next packet transmission. That is, the system bus is maintained open for a packet transmission until the packet is transmitted to the bus gateway device 120, whereupon the system bus is no longer held open, and may be used to transmit other packets. The packet received by the bus gateway device is then transmitted over the module bus 122 according to its availability. An exemplary header word format for a system bus using a 64 bit packet communications scheme is shown in Table 1.

TABLE 1

| Bit(s) | Name | Function | Value |
|---|---|---|---|
| 63:52 | TSIZE | Transaction Size | 1 to 4096 Packets |
| 51:47 | ACODE | Action Code | (See Action Code Tables 3, 5, 25) |
| 46 | <spare> | Undefined | "0" |
| 45:44 | TTYPE | Transaction Type | (See Transaction Type Table 2) |
| 43:38 | DDA | Destination Device Address | 43:41 = Module (ECA) Address<br>40:38 = Device Address |
| 37:32 | SDA | Source Device Address | 37:35 = Module (ECA) Address<br>34:32 = Device Address |
| 31:0 | DMAD | Dest Memory Address | 31:0 = Add for Simple Write DMA |
|  | DIVEC | Dest Interrupt Vector | 7:0 = Vector for Interrupt CA |
|  | RRAD | Dest Local Read Address | 31:0 = Read Request CA |
|  | BCMSK | Dest Broadcast Mask | 3:0 = Broadcast Mask |

Each bus gateway device 120 within the temporal processor module is capable of buffering four packets in each direction, and acts as a bus repeater within the 64 bit packet communications scheme. The gateway device 120 recognizes packet addresses that need to cross the gateway 120 in either direction to the local module bus 122 or to the system bus 102, and receives those packets into its input buffers. These buffers are provided to ensure that as packets are received by the gateway device, they may be stored until the gateway device has determined if they are addressed to a location within the module arbitrated by that gateway device. When the gateway device 120 has a packet in either of its buffers, the gateway device shall arbitrate for, and clear a channel to, the appropriate destination. This process of buffering packets through the gateway 120 allows the sending bus to be released for other functions prior to the packet reaching its final destination, which allows for greater freedom from network communication system traffic on the system bus, for example.

The addressing scheme for modules and devices on the system bus in a 64 bit packet communications scheme includes a 6 bit address field. Three bits are reserved for selecting modules or devices on the system bus, and three separate bits reserved for selecting devices on the module bus. Hence, on the system bus 102, or the module bus 122, there is a total of 8 addresses possible. The address 0 on the system bus 102 is reserved for the system controller 104, as indicated in FIG. 1. The address 0 on the module bus 122 is reserved for the bus gateway device 120, as indicated in FIG. 1. Addresses 1–6 are reserved for modules or devices and/or modes, such as the temporal processor modules 114, 116, and 118, and the sensor interface 130. As is apparent from the addressing system, the processor system bus architecture 100 shown in FIG. 1 can be expanded to include more modules or devices to occupy the address locations 2 and 6 on the system bus. Also, the module bus 122 can use addresses 1–6 for nodes contained within the temporal processor modules 114, 116, and 118. Therefore, the number of nodes illustrated in the exemplary FIG. 1 embodiment within each of the temporal processor modules can be expanded to a total of 6 per module (addresses 1–6). Address 7 is used to indicate a broadcast address that will transmit to all receivers simultaneously and will require the bus to be cleared of activity. The various device addresses are indicated in FIG. 1, wherein "BAdd Config. Module Add" and "Bus Addr. Mod. Add" correspond to system bus addresses of various devices, and "DAdd" corresponds to local, or module bus addresses.

Arbitration

Arbitration within the processor system bus architecture 100 shown uses a modified rotating priority scheme where the module or device address 0 has a fixed priority, which is the highest. Devices having the address 1–6 rotate in priority each time they access the bus. The manner by which addresses 1–6 rotate in priority may include, for example, a round robin rotation. The manner in which addresses 1–6 rotate in priority can vary, however, as will be recognized by those skilled in the art, but this rotation shall maintain nearly random sequencing to allow for system bus traffic to be minimized. Address 7 is a broadcast address that transmits to all receivers simultaneously and requires the bus to be cleared of activity by halting access to the system bus 102 until all receivers are clear to allow for all receivers, or gateways 120, to receive a broadcast message simultaneously. In many conventional bus architecture systems, by contrast, it is necessary to incorporate wait states or transition aborts in cases where the system bus is too busy to transmit a message, or a receiving destination is incapable of receiving a transmission. However, the present invention eliminates the need for such wait states or transition aborts as the bus arbitration logic ensures that each destination is capable of receiving a packet before access to the system bus 102 is granted.

The lack of need for wait states is accomplished through the use of bus destination address lines (BDAL) from each bus requester that indicate the local address of the intended destination module or device. This address may include addresses 0–6 for specific modules or devices, or 7 for a broadcast message. On the system bus 102, the local destination is the module address. On the module bus 122, the local destination is the device address of each node intended to be accessed or addressed. Additionally, a receiver busy bit (RBB) is provided by each destination interface used by the arbitration logic and indicates when a device is busy. This RBB is used in connection with the BDAL to determine that a path is clear and a bus grant (BG), or access to the system bus 102, can be given.

In the case that the module address is intended to be transmitted outside of the module, through the bus gateway 120 and over the system bus 102, the bus interface device checks to see if the packet to be transmitted is addressed to a module other than the local one. If such an external address exists, the bus interface device uses an address 0 on the BDAL to indicate that the packet is to be routed externally from the module through the gateway device. The correct destination device address is included in the packet header because the BDAL only includes the destination device address, and the arbitration unit or bus gateway device 120 would not otherwise be able to determine if the packet is to be transmitted on or off board.

The rotating priority mechanism can be implemented such that each time a bus grant (BG) is given, the priority of devices 1–6 rotates. This round robin-style rotation can occur such that the relationship of the relative priority pointer to the bus request lines increments. In this manner, a priority value, such as 1, which may be assigned to a bus request signed by the device with address 3, for example, may be caused to move to a device making a bus request with address 4, and all other bus requests would be moved accordingly.

One important aspect of the present invention is that the priority scheme of the arbitration logic causes a currently granted master to yield control of the bus upon completion of its transfer to any other requesting master despite priority. Therefore, when multiple bus requests are present, the bus is yielded to another master between each packet preventing the bus from being dominated by a single master carrying out a large transfer of multiple packets. During times that no other master is requesting a bus, the arbitration logic administered by the system bus arbitration unit 112 will continue to grant access to the current master, thereby allowing it to transfer successive packets without clock delay often experienced in systems incorporating switching bus masters. When several masters request bus access, the one with higher priority shares with the others, alternating every other clock cycle with the masters having lower priorities, who gain access between access times by the master with the higher priority on a rotating priority basis.

The system controller 104 is given a priority address 0 on the system bus 102. The bus gateway 120 are granted a priority address 0 on each module bus 122 within each temporal processor module 114, 116, 118. Because of this ultimate priority, the system controller 104 and the bus gateway 120 are guaranteed to access the system bus 102, and module bus 122, respectively, during the packet cycle immediately following the cycle during which they requested it. This is crucial for the system controller 104, as it is the primary controller in the system that coordinates the initialization and operation of all modules 114, 116, 118, 130 in the system. The bus gateway device 120 also requires this high priority on the module bus 122, as it retransmits packets between the system bus 102 and its local module bus 122 and control arbitration on the module bus 122.

The processor system bus architecture 100 can also implement an arbitration time out scheme that checks for an assertion of a time out indication. This time out indication (ABBb) can be given within an unspecified number of clock cycles from the issuance of a bus grant to a given master. If the time out period expires, the arbitration unit will remove the grant and wait a minimum of one clock cycle before asserting the next grant. During this minimum wait time of one clock cycle, the arbitration logic can check to see if the previously granted master asserted the ABBb indication before asserting the grant to the next prioritized requesting master. Such arbitration logic for the system bus 102 is located in the system controller 104, while for the module bus it is located within the bus gateway 120.

Figure 2:
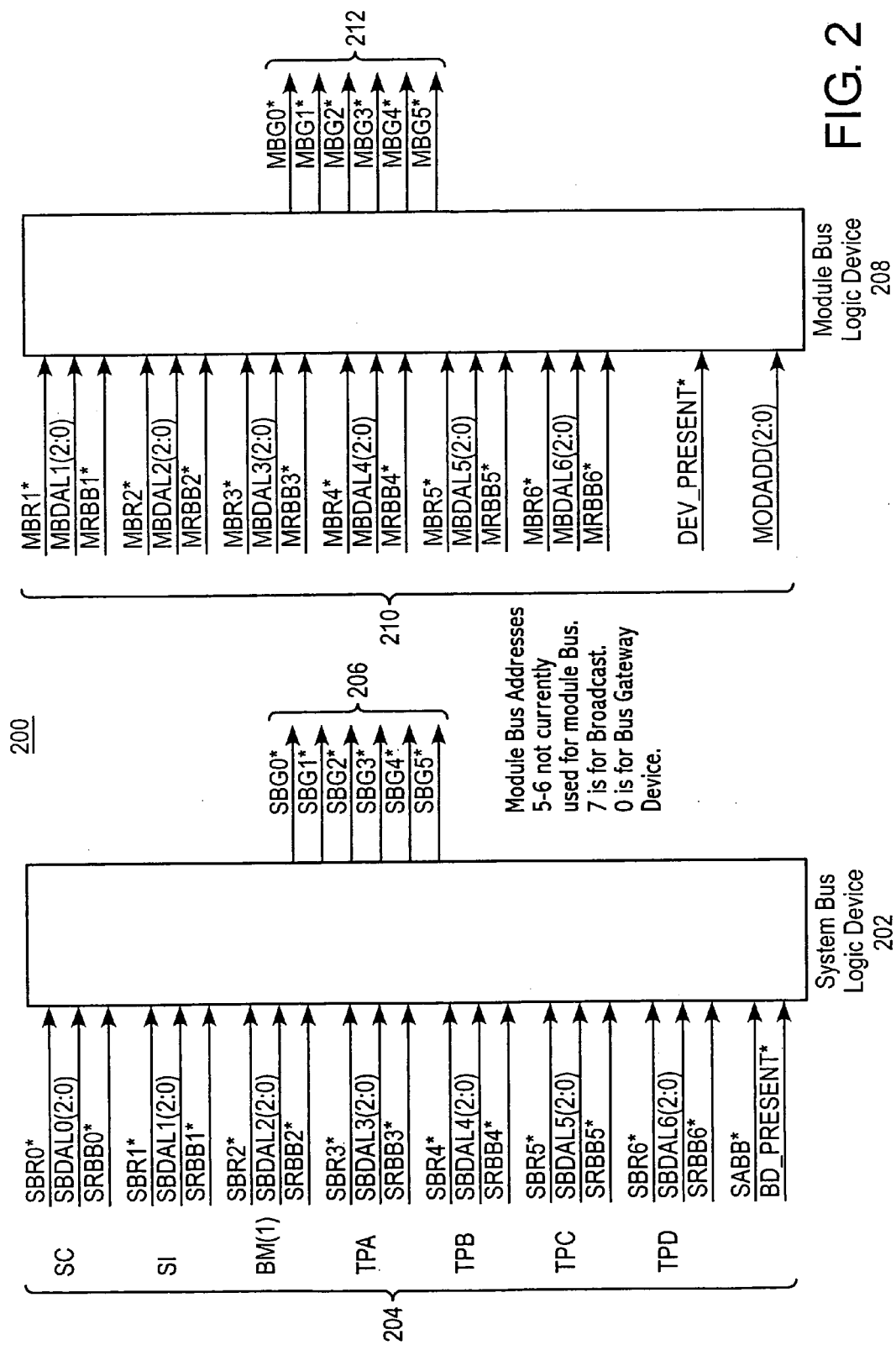
FIG. 2 is a block diagram of bus arbitration logic in accordance with an exemplary embodiment of the present invention.

FIG. 2 is a block diagram illustrating the bus arbitration logic 200 and signals associated with the system and module bus arbitration. The system bus logic device 202 is used within the system bus arbitration unit 112 of the system controller 104. On the left of the system bus logic device 202 are signals 204 associated with the various devices and modules connected to the system bus 102. These include: signals from the system controller 104 designated SC, signals from the sensor interface 130 designated SI, signals from a bulk memory device designated BM(1), and signals from temporal processor modules designated TPA, TPB, TPC, and TPD.

The signals from each of these modules and devices on the system bus 102 are the same, and will be treated together. The letter S, which is the first letter of each signal received by the system bus logic device 202, indicates that each of these signals is associated with the system bus 102, as opposed to a module bus 122. The numbers at the end of each signal indicate the address associated with the signal. For example, address 0 has the highest priority, and addresses 1–6 have rotating priorities, as previously discussed.

The first signal associated with each module or device on the system bus is a system bus request (SBR*) that requests access to the system bus. The second signal is the system bus destination address lines (SBDAL) that indicates the local address of the intended destination module or device. The third signal associated with each module or device is a system receiver busy bit (SRBB*), which is used by the arbitration logic in connection with the SBDAL to determine whether a path is clear, and a bus grant (BG) may be made. If the SRBB* has been asserted, then the system bus arbitration unit 112 knows that a path to the desired module or device is not clear.

The additional signals 204 on the left hand side of the system bus logic device 202 include: SABB*, which is an address strobe signal for arbitration in rotating the priority of the different devices or modules connected to the system bus; and BD_PRESENT* that indicates which devices are present, and may be accessed via the system bus 102. SABB* is asserted as an active low signal after a bus grant is given and stays on for one clock cycle, during which time a packet header is transferred. The signals 206 on the right hand side of the system bus logic device 202 correlate to system bus grants (SBG*), which are transmitted to different modules indicating that they may use the system bus 102. These signals are also active low signals containing device addresses.

Similarly, the module bus logic device 208, shown in FIG. 2, has a variety of signals 210 on the left hand side, that correspond to various nodes on the module bus 122, shown in FIG. 1. As with the signals of the system bus logic device 202, the signals associated with the module bus logic device 208 begin with the letter M to designate that the signals are associated with devices on the module bus 122, and end in a numeral that indicates the address of the module device or mode associated with the signal. Accordingly, the signal designated MBR* refers to the module bus request, with the terminating numeral indicating the address associated with that request. The signal MBDAL is the module bus destination address lines, which is transmitted from each bus requester indicating the local address of the intended destination module or a device. This MBDAL signal is used in conjunction with the module receiver busy bit signal (MRBB*) by the arbitration logic to determine that a path is clear and that a module bus grant (MBG*) can be made. Two signals are provided, which include: DEV_PRESENT* that corresponds to a signal detecting which devices are present on the module bus 122; and MODADD that corresponds to a signal for rotating the module device addresses connected to the module bus 122. The signals 212 to the right of the module bus logic device 208 correspond to module bus grants (MBG*), with corresponding addresses.

Multiple Interleaved Masters

Figure 3:
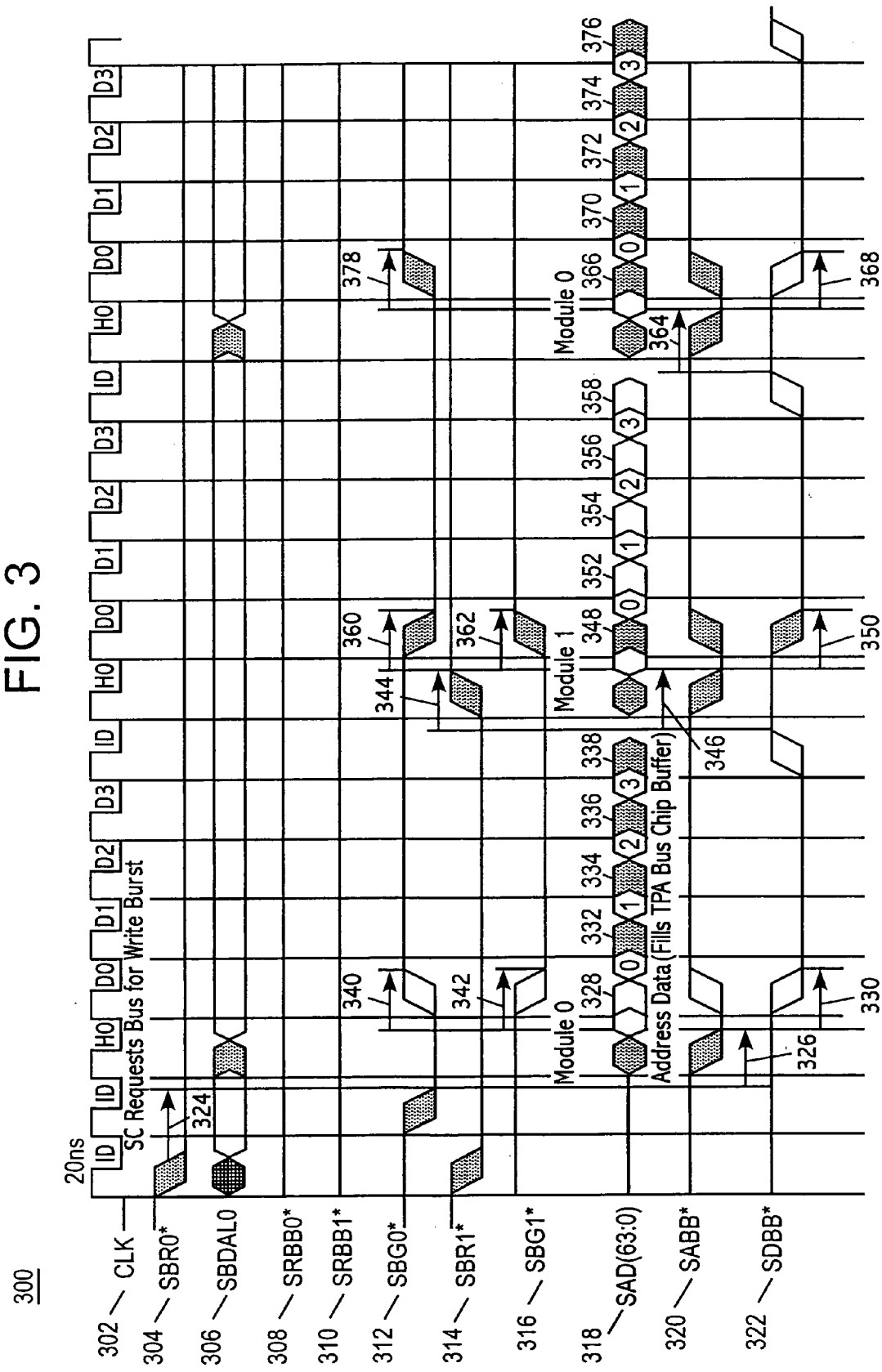
FIG. 3 is an exemplary timing diagram for a two master interleave bus arbitration scenario.

FIG. 3 contains a timing diagram 300 that describes a scenario for bus arbitration in a two master interleave configuration, wherein two masters access the system bus 102 in an interleaving fashion. In the timing diagram 300, a clock signal CLK 302 of 20 ns is used. It will be recognized by those skilled in the art, however, that a clock cycle of varying length could be used with the present invention. The clock cycles have identifying information indicators for reference, such as "ID," "H0," "D0," "D1," "D2," "D3," etc. The indicator "ID" means that bus access is available. The indicators beginning with "H" and "D" refer to the type of information being transferred, i.e., header or data transfers, respectively.

In the timing diagram 300 of FIG. 3, various signals are provided for requesting bus access, granting bus access, and facilitating bus data transfers. Signals dealing with devices having the address 0 end in "0," and signals dealing with the address 1 end in "1." Signals beginning with the letter "S" correspond to system bus signals. For example, the system bus request SBR0* 304 corresponds to a system bus request made by the device with the address 0, which is the system controller 104. The system bus destination address lines signal SBDAL0 306 is used to determine if the destination device is available to receive transmissions. The receiver busy bit signals for each of the two interleaved masters SRBB0* 308 and SRBB1* 310, used to indicate if the devices are busy, signaling that the corresponding device is not available to receive data packet transmissions. The system bus grant signal SBG0* 312 for the device with the address 0 is used to indicate to the device with that address that bus access has been granted.

Signals from the second of the two interleaved masters in timing diagram 300 of FIG. 3 are shown using the address 1. For example, this second device, which may be a temporal processor module, for example, may also request bus access using system bus request signal SBR1* 314, and may be granted access to the bus by a system bus grant signal SBG1* 316.

The system address data bus signal SAD(63:0) 318 is used to transmit the data packets. In accordance with one embodiment of the present invention, these data packets comprise 64 bits of data. However, it will be appreciated by those skilled in the art that packets of varying length could be transmitted sing a similar system address data bus signal, configured to operate with larger data packets. The remaining signals in the timing diagram 300 of FIG. 3 are used to facilitate bus arbitration. Signal SABB* 320 is activated immediately after a bus grant is given, or a bus grant signal is transmitted over the system bus. This signal 320 remains active for one clock cycle, during which the header of the data transaction is transferred. The signal SDBB* 322 is activated after SABB* 320, and remains active for four clock cycles, or during the period required to complete one direct memory access (DMA) transaction. In the timing diagram 300, illustrated in FIG. 3, the signal SDBB* 322 remains active for one DMA transaction, or four clock cycles, which corresponds to the time required to transmit four 64 bit words. However, those skilled in the art will readily recognize that the size of the packets used in the DMA transaction may be increased or decreased depending upon processor speeds involved, and other limiting factors due to material science, or semiconductor technology.

In the situation illustrated in the timing diagram 300, two system bus devices with addresses 0 and 1 request access to the bus simultaneously using system bus request signals SBR0* 304 and SBR1* 314, respectively. As discussed previously, the device with address 0 has the highest priority in accessing the bus, and therefore, bus access is granted to this device first by way of the system bus grant signal SBG0* 312. In accordance with the arbitration protocols of one embodiment of the present invention, the system bus destination address lines signal SBDAL0 306 is used to determine that the destination device to which the device with address 0, or system controller 104, desires to transmit is not busy. This is accomplished by checking the receiver busy bits, such as SRBB0* 308 and SRBB1* 310. As can be seen from FIG. 3, both of the repeater busy bit signals 308 and 310 are active low signals, which are not being asserted and remain at a high logic level.

Upon determining that none of the busy bits of the addressed modules have been asserted, and that the destination device is not busy, and is available to receive packet data transmissions, the system bus grant is given approximately one clock cycle after it is requested to the system controller 104. Arrow 324 indicates that the time between the system bus request signal being transmitted, and the system bus grant signal being asserted is approximately one clock cycle, or about 20 ns. As indicated by arrow 326, the signal SABB* 320 is asserted approximately one clock cycle after the bus grant has been given by the signal SBG0* 312. This signal 320, as previously discussed, is activated, and remains active for one clock cycle during which the header 328 of the data packet is transferred. Arrow 330 indicates that the signal SGBB* 322 is activated one clock cycle after signal SABB* 320 is activated. This signal 322 remains active for four clock cycles, during which time one DMA transaction of four 64 bit words may be transmitted. That is, as the signal SDBB* 322 is asserted, the various words, 0–3, 332, 334, 336, 338 are transmitted. In accordance with one embodiment of the present invention, this packet transmission data is transmitted by module 0 to a module with a different destination address, such as a temporal processor module. The data words fill the memory buffers of the particular device to which it is transmitted, such as a temporal processor module.

As illustrated in the timing diagram 300 of FIG. 3, once the signal SABB* 320 is asserted, the system bus grant signal SBG0* 312 is no longer actively asserted. The time for this signal to be deactivated is approximately one clock cycle, and is indicated by arrow 340. As this system bus grant signal SBG0* 312 is no longer active, a system bus grant signal SBG1* 316 may grant bus access to the device with address 1, or module 1, one clock cycle after the signal SABB* 320 is asserted. This is indicated by arrow 342. The second master, or module 1, maintains an active bus request signal SBR1* 314 until the time when it can assert the signal SABB* 320 to begin transfer of the packet header. This time occurs one clock cycle after the signal SDBB* 322 is no longer active, indicating that the transfer from module 0 is complete, and the bus is available for further transfers. Arrows 344 and 346 indicate that one clock cycle after the signal SDBB* 322 is no longer active, the bus request by module 1 SBR1* 314 no longer remains active, and the signal SABB* 320 may be asserted for the transfer from module 1, respectively. Signal SABB* 320 remains for one clock cycle during which time the packet header 348 is transferred. As indicated by arrow 350, one clock cycle after SABB* 320 is asserted, the signal SDBB* 322 is asserted, and remains active for the period of four clock cycles, to allow for the transfer of the four data words, 0–3, 352, 354, 356, 358, contained within the data packet to be transmitted by module 1.

As can be seen in the timing diagram 300, one clock cycle after the signal SABB* 320 is asserted by module 1, thereby initiating transfer of the data packet header 348, the system bus grant signal SBG1* 316 to module 1 is not active. Likewise, the system bus grant to module 0, is again asserted. Both of these events occur one clock cycle after the signal SABB* 320 is asserted by module 1, as indicated by arrows 360 and 362. The system bus grant to module 0 remains active until the signal SABB* 320 has been asserted by module 1. The signal SABB* 320 is asserted one clock cycle after the signal SDBB* 322 is no longer active, signifying that the data packet transfer by module 1 is complete, as indicated by arrow 364. As before, the signal SABB* 320 remains active for one clock cycle during which time the header 366 from the next data packet transferred by module 0 is transmitted. As before, one clock cycle after the signal SABB* 320 is asserted by module 0, the signal SDBB* 322 is asserted by module 0, as indicated by arrow 368. The signal SDBB* 322 remains active for four clock cycles, during which time a complete DMA transaction, transmitting a data packet containing four data words, 0 to 3, 370, 372, 374, 376 are transmitted. Also one clock cycle after the signal SABB* 320 is asserted, indicating the initiation of a transfer of another packet by module 0, the system bus grant signal SBG0* 312 is no longer active, as indicated by arrow 378.

The timing diagram 300 of FIG. 3 illustrates some of the advantages of the present invention. For example, although the device with the address 0, or module 0, has the highest priority, it cannot dominate the bus. In the current scheme, although this module 0 has the highest priority, and continues to request the bus by asserting the system bus request signal SBR0* 304, its bus grant, indicated by system bus grant signal SBG0* 312 is no longer asserted beginning one clock cycle after the signal SABB* 320 is asserted, thereby terminating its bus access and allowing only one packet of data to be transferred by module 0 at a time. The arbitration scheme then allows a bus grant to be made to the device with the address 1, which is lower priority than module 0, to gain access to the bus, indicated by system bus grant signal SBG1* 316. In the scenario illustrated in FIG. 3, module 1 only requests access to the bus for the transfer of a single data packet; however, if module 1 were to request the bus for more packets, it would continue to alternate with module 0, thereby maximizing the system bus usage, and minimizing the time between system bus requests by specific devices and system bus access grants by the arbitration unit. Another principal advantage of the present invention is that it can be implemented in hardware without the need for software arbitration or the problems associated with it.

The present invention is also advantageous, in that it provides a system bus destination address lines signal, which allows verification that the device to which a module wishes to transmit is not busy by checking the receiver busy bit signals of the various devices on the system bus. In each case, one clock cycle before a system bus grant is made, the system bus destination address line signal SBDAL0 306 verifies that the destination device is available to receive packet transmissions. This is advantageous, in that many of the prior approaches, such as the well known PCI bus protocol, transmit without checking to see if a device is busy, and if a device is busy continue to abort and retry data packet transmissions, which can overload a system bus, and cause critical failures in computing systems. The system bus destination address line signal SBDAL0 306 is also useful in that it waits until a transmission currently in progress is terminated, as indicated by the deactivation of the signal SDBB* 322, so that it can verify the readiness of the receiving device during a time when the bus is not busy.

Timing diagram 300 in FIG. 3 illustrates a scenario during which bus arbitration creates a two master interleave configuration, wherein two masters access the system bus 102 in an interleaving fashion. However, the number of devices which may be interleaved in this fashion is unlimited. For example, the present invention provides for devices having addresses 0–7, which could all be utilized in an interleaving arbitration scenario, such as the one shown in FIG. 3, for example. Additionally, more than the eight devices provided for by one embodiment of the present invention could be used in such a fashion, and such a configuration is intended to be included within the scope of the present invention. In such a scenario, similar rules of priority, and rotating priority between various devices could be implemented in the fashion described in connection with the present invention with similarly advantageous results.

Single Master Back-to-Back Data Transfers

Figure 4:
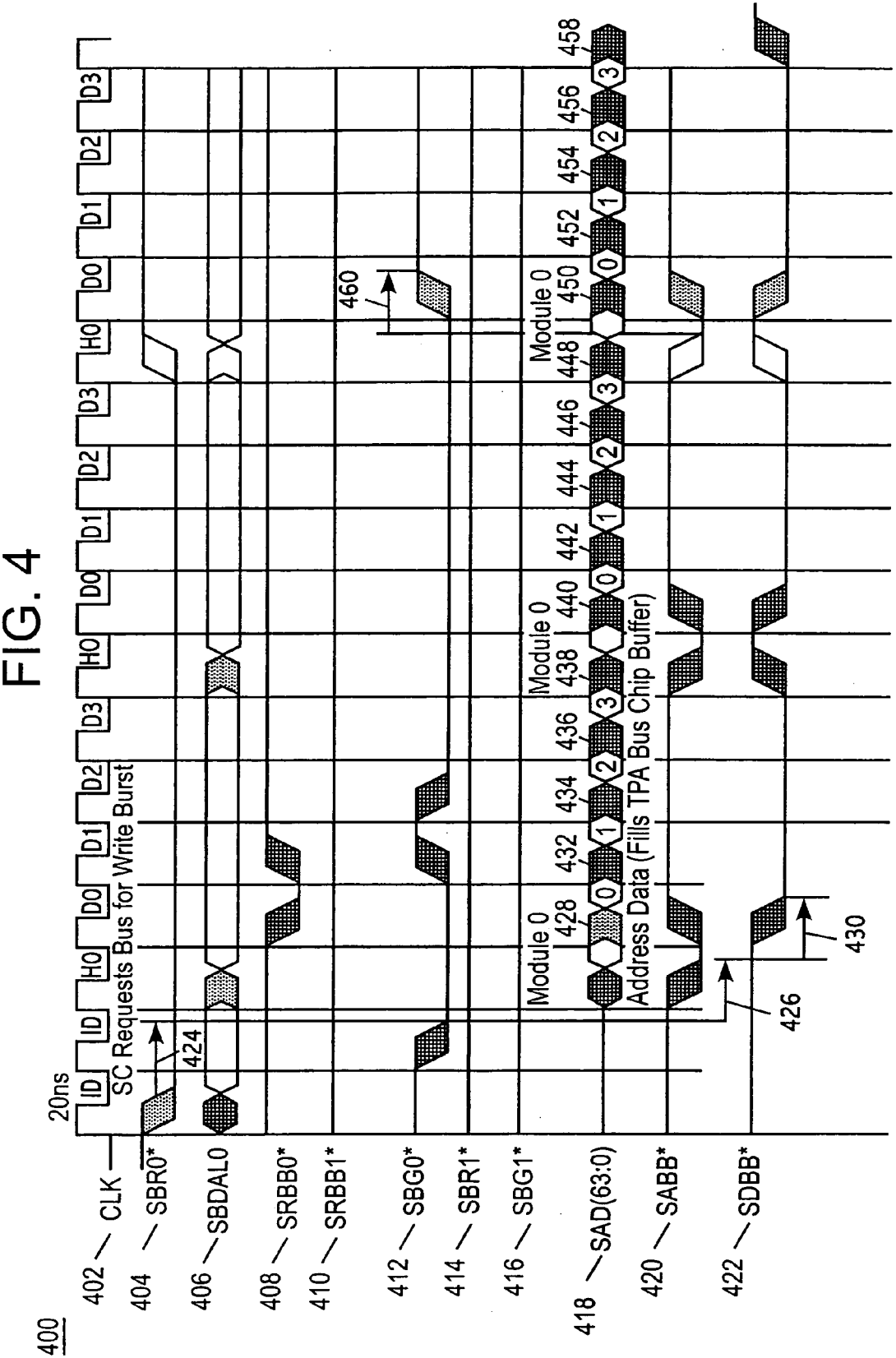
FIG. 4 is an exemplary timing diagram for a single master back-to-back packet transfer bus arbitration scenario.

FIG. 4 is a timing diagram 400 which illustrates a single master back-to-back packet transfer bus arbitration scenario. In the timing diagram 400, a clock signal CLK 402 having a period of 20 ns is generated. The clock cycles illustrated in the timing diagram 400 have identifying information used for reference purposes, as described in connection with the clock signal 302 of FIG. 3. It will be recognized by those skilled in the art, that a clock cycle having a varying length could be used with the present invention.

In the timing diagram 400 of FIG. 4, various signals are used by two different modules having addresses 0 and 1, which are similar to the signals used in the two master interleave configuration timing diagram 300 of FIG. 3. The device with the address 0, or module 0, has a system bus request signal SBR0* 404, a system bus destination address line signal SBDAL0 406, and a system receiver busy bit signal SRBB0* 408. The device with address 1, or module 1, also has a system receiver busy bit signal SRBB1* 410. A system bus grant for module 0 is granted by the signal SBG0* 412. Module 1 may also request access to the system bus using the bus request signal SBR1* 414. Bus access is granted to module 1 using the bus grant signal SBG1* 416. The system address data bus signal SAD(63:0) 418 is used to transmit direct memory access packet transmissions. Signals SABB* 420 and SDBB* 422 are asserted to indicate the transmission of packet headers and packet data words, respectively, as in timing diagram 300 of FIG. 3.

As in timing diagram 300 of FIG. 3, the timing diagram 400 of FIG. 4 illustrates a scenario in which module 0 requests access to the system bus by asserting the system bus request signal SBR0* 404. Upon the assertion of the system bus request signal SBR0* 404, the bus destination address lines signal SBDAL0 406 checks to ensure that the destination device is no busy, by checking the receiver busy bits, such as SRBB0* 408 and SRBB1* 410. After determining that the destination device is not busy by way of the signal SBDAL0 406, the system bus grant signal SBG0* 412 is asserted, granting module 0 access to the system bus approximately one clock cycle after the request was made, as shown by arrow 424. In accordance with one embodiment of the present invention, the timing diagram 400 illustrates a case wherein module 0 is the system controller 104, shown in FIG. 1, which requests bus access to perform a write burst operation.

As shown by arrow 426, one clock cycle after access to the system bus has been granted, as indicated by arrow 426, the signal SABB* 420 is asserted, and remains active for one clock cycle during which time the packet header from module 0 428 is transmitted. Arrow 430 indicates that one clock cycle after the signal SABB* 420 has been asserted, signal SDBB* 420 is asserted, and remains active for four clock cycles, during which time a complete DMA transaction of four bits, 0–3, 432, 434, 436, 438, may take place.

During the transfer of the first data packet for module 0 containing the header 428 and four 64 bit words 432, 434, 436, 438, the receiver busy bit for module 0 SRBB0* 408 is asserted, indicating that the device has become busy, and cannot receive further data packet transmissions. In response, the system bus grant SBG0* 412 is taken from the active state about one clock cycle after the receiver busy bit signal SRBB0* 408 is asserted. This prevents module 0 from accessing the bus when the desired receiver is busy, and prevents any necessity for transmission aborts and retries, such as those in the prior approaches. However, the receiver busy bit signal SRBB0* 408 is deactivated almost immediately after it is asserted, indicating that the receiver is no longer busy, and can accept further data packets. Approximately one clock cycle after this indication, the system bus grant signal SBG0* 412 is again asserted, allowing module 0 access to the system bus.

Once the last word 438 of the DMA packet transfer has been transmitted, a second data packet, beginning with the header 440, and containing the four data words, 0–3, 442, 444, 446, 448, is begun. This occurs because no bus request has been made by a second master, or module, as indicated by the inactive system bus request signal from the device having address 1 SBR1* 414. As no other device is requesting access to the bus, and the bus destination lines signal SBDAL0 406 has determined that there are no currently asserted receiver busy bits, such as SRBB0* 408 and SRBB1* 410, module 0, which has an active bus request SBR0* 404 retains write access to the system bus. Thus, the signal SABB* 420 is again asserted, and maintained active for one clock cycle during which time the header 440 of the second data packet is transmitted. One clock cycle later, the signal SDBB* 422 is asserted, and remains active for four clock cycles, allowing a complete DMA transaction of four data words of a second data packet, 0–3, for 442, 444, 446, 448, to be transmitted.

Module 0 retains control of the bus again to transmit the third data packet containing header 450 and data words of a third data packet 452, 454, 456, 458, as no other device has requested access to the bus by asserting a system bus request signal, such as SBR1* 414, which remains inactive during the entire time illustrated in timing diagram 400.

Once the device with address 0, or module 0, has transmitted all of the data packets that it must transmit, in this case three, it discontinues its system bus request signal SBR0* 404. This occurs when the signal SABB* 420 for the last data packet is asserted and allows for the transmission of the packet header 450. One clock cycle after this signal SABB* 420 is asserted for the last data packet, as shown by arrow 460, the system bus grant signal SBG0* 412 is deactivated, indicating that module 0 no longer has access to the system bus. Also one clock cycle after the assertion of the signal SABB* 420, the signal SDBB* 422 is asserted and remains active for four clock cycles allowing for a complete DMA transaction to take place containing four data words of the third data packet, 0–3, 452, 454, 456, 458.

The timing diagram 400 illustrated in FIG. 4 indicates that back-to-back transmissions by a single bus device may be accomplished, as long as the receiver busy bits, such as SRBB0* 408 and SRBB1* 410 are not asserted and maintained active, as checked by the bus destination address line signal SBDAL0 406, and no other device, such as module 1, requests access to the bus, for example by a bus request signal SBR1* 414. In this manner, the implementation of the bus arbitration scheme in hardware allows for faster access times to the bus and requires no software arbitration protocol, as the entire protocol is implemented in hardware. This arbitration scheme is further advantageous in that the bus is not tied up with attempted transmissions, as the arbitration scheme prevents any transmissions which do not have an available device from occurring. In this manner, the present invention maximizes the bus usage, ensuring that the system bus is only used for actual transmissions. This is advantageous over the prior approaches, as the software is required to arbitrate the bus access, and multiple attempts to access a busy device may tie up the bus, preventing transfer from occurring.

Timing diagram 400 illustrates a case in which a single device may write continuous packets to the system bus. In timing diagram 400, only two devices, having addresses 0 and 1, are illustrated. However, many more devices may be included in a similar arbitration scheme. For example, the present invention allows for devices having addresses 0–7. Additionally, it is fully contemplated that many more devices may access a system bus using the same arbitration scheme described herein, and such a system having more devices is fully intended to be encompassed within the scope of the present invention.

Transaction Types

There are essentially three basic types of bus operations supported by the present invention. These basic operations are outlined below in Table 2. All transfers outlined below in Table 2 are made up of transmitted packets which contain a header word followed by 1–4 64 bit data words. These transaction types include: a simple write (SW), a requested write (QW) and a control action (CA).

TABLE 2

| Transaction Type | Code | Value | Description |
|---|---|---|---|
| Simple Write | SW | 00 | Send write Packet(s) 1 or 4 words |
| Request Write | QW | 01 | Requested write packet(s) |
| Control Action | CA | 11 | Interrupts/Test and set or clear |

The packets transmitted according to the transaction type indicated above in Table 2 are sent using a similar technique as mail, and may route through as many as two bus gateways in order to transfer from one module bus to another. Each bus interface or gateway is able to buffer at least four packets in each direction, and must be capable of supporting a retransmit function. Each bus interface or gateway also has a time out signal that returns an error packet after attempting four retries. Those skilled in the art, however, will recognize that the number of data words contained within each data packet, the number of packets required to be sent by each bus interface or gateway, and the number of retries attempted before returning an error signal may be modified according to the desired result without departing from the spirit of the invention.

Multi-Leveled Multi-Master Transfers

Figure 5:
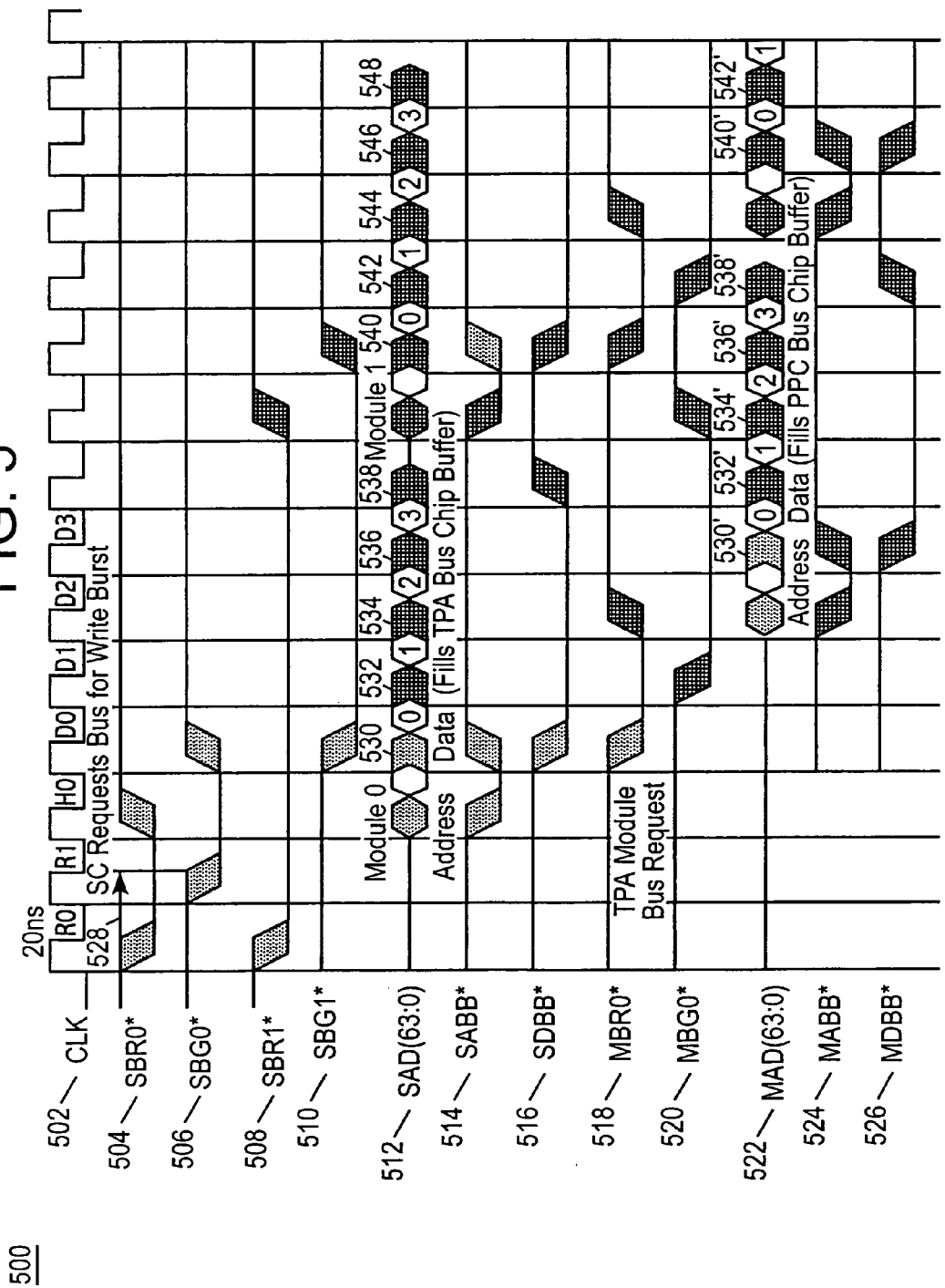
FIG. 5 is an exemplary timing diagram illustrating a two level access scenario with multimaster timing.

FIG. 5 contains a timing diagram 500 which illustrates the transaction timing for two-level transfers in a multimaster interleaved transfer arbitration scheme. This two-level transfer arbitration is so-called because it refers to situations in which data is communicated from one bus level, such as the system 102, to a second bus level, such as the module bus 122. In the timing diagram 500, the clock signal CLK 502 has a period of 20 ns. The clock cycles shown in timing diagram 500 have identifying information indicators for reference, such as the identifying indicators described in connection with timing diagram 300 of FIG. 3. It will be recognized by those skilled in the art that a clock cycle of varying length could be used with the present invention, and need not be limited to a period of 20 ns.

The various signals illustrated in timing diagram 500 of FIG. 5 are similar to the signals discussed in connection with timing diagrams 300 and 400 of FIGS. 3 and 4, respectively. However, one major difference in timing diagram 500 of FIG. 5 is that some signals are module bus commands as opposed to system bus commands. As with the previous figures, system bus commands are indicated by beginning with the letter "S." The signals connected with commands associated with the module bus begin with the letter "M." Signals associated with two different devices connected to the system bus, having addresses 0 and 1, are shown in timing diagram 500 of FIG. 5. Those signals associated with the device having address 0 end in "0," and those associated with the device having the address 1 end in "1." The system controller, or module 0, having the address 0 may issue a system bus request signal SBR0* 504, and a system bus grant may be given to module 0 by the system grant signal SBG0* 506. Likewise, a system bus request and system bus grant exist which are associated with module 1, signals SBR1* 508 and SBG1* 510, respectively. As with the previous figures, a system address data bus signal SAD(63:0) 512 and signals SABB* 514 and SDBB* 516 associated with the transfer of a packet header and packet words, respectively, are provided.

In timing diagram 500, module bus devices, and the signals associated with transmission of data over the module bus are illustrated. For example, a device having the address 0, which indicates priority, on the module bus 122 has a module bus request signal MBR0* 518 and a module bus grant signal MBG0* 520 associated with it. Additionally, associated with the module bus is a module address data bus signal for transmitting the data packets MAD(63:0) 522. Signals associated with the module bus packet headers and words MABB* 524 and MDBB* 526, respectively, are provided for, and function similarly to the signals having the same last three letters on the system bus.

The events illustrated in the timing diagram 500 of FIG. 5 illustrate the transmission of packets from two different modules to a module bus, and help illustrate the delays associated with such transfers. The system address data bus signal SAD(63:0) 512 corresponds to the data packets being received by the gateway of the particular device on the system bus and the module address data bus signal MAD(63:0) 522 corresponds to the gateway of the particular device retransmitting the packets via the module bus to various nodes within the module.

In timing diagram 500, a system bus request from the devices having addresses 0 and 1, or module 0 and module 1, request access to the system bus. Approximately one clock cycle after the system bus request is made by module 0, as indicated by arrow 528, a system bus grant signal SBG0* 506 is granted allowing module 0 to write to the system bus. Approximately one clock cycle later, the signal SABB* 514 is asserted, and remains active for one clock cycle, during which the packet header 530 is transmitted associated with the data packet transmitted by module 0. When this signal 514 is asserted, the system bus request is deactivated, as module 0 has only one packet to transmit. As with FIGS. 3 and 4, approximately one clock cycle after the signal SABB* 514 is asserted, the signal SDBB* 516 is asserted, and remains active for four clock cycles, during which a complete DMA transaction is allowed, wherein four words of the data packet, 0–3, 532, 534, 536, 538 are transmitted. This data packet is read into the buffer of the destination temporal process module, in this case indicated as TBA bus chip buffer.

The timing diagram 500 illustrated in FIG. 5 differs from those of FIGS. 3 and 4, in that the operation of the module bus is included. One clock cycle after the assertion of the signal SABB* 514, a module bus request MBR0* 518 is made. Assuming that there are no receiver busy bit signals detected, and that the destination address line signal permits transmission on the module bus, access to the module bus is granted by asserting the module bus grant signal MBG0* 520. This module bus request takes place only after the data packet header is recognized, and the address contained therein is to be accessed via the module bus in question. For example, if a processor, such as a power PC (PPC), is to be accessed, and is on the module bus, then the gateway device recognizes this address, and requests access to the module bus with a module bus request signal MBR0* 518. One clock cycle after the module bus access has been granted by module bus grant signal MBG0* 520, the signal MABB* 524 is asserted, and remains active for one clock cycle, during which the data packet header 530' is transmitted. One clock cycle after the signal MABB* 524 is asserted, the signal MDBB* 526 is asserted, and remains active during four clock cycles, during which time the four words of the data packet, 0–3, 532', 534', 536', 538', are transferred.

On the system bus, one clock cycle after the signal SDBB* 516 is not active, the signal SABB* 514 is asserted, and remains active during one clock cycle, in order to transmit the packet header 540 of the second data packet originating from the device with the system bus address 1, or module 1. Upon assertion of the signal SABB* 514, the system bus grant to module 1 expires, and the signal SDBB* 516 is asserted, and remains active for four clock cycles, during which time the four data words, 0–3, 542, 544, 546, 548, are transmitted. Also one clock cycle after the transmission of the header 540 of the second data packet for module 1 begins, the gateway device may transmit the module bus request MBR0* 518. This request is transmitted if the desired device contained in the address field is contained on the module bus, and the destination device is not busy, according to the receiver busy bit signal, or the destination address lines signal on the module bus. One clock cycle later access may be granted to the module bus by asserting the module bus grant signal MBG0* 520. One clock cycle after access to the module bus is granted by asserting the module bus grant signal MBG0* 520, the signal MABB* 524 is asserted, and remains active for one clock cycle, during which time the header 540' is transmitted. One clock cycle later, the signal MDBB* 526 is asserted and remains active for four clock cycles, during which time the words of the data packet 542', 544', 546', 548' may be transmitted.

The situation illustrated in the timing diagram 500 is similar to the two master interleave situation illustrated in timing diagram 300 of FIG. 3. There is slight delay introduced, between the transfer of the two data packets, associated with the time required for a second device to request and gain access to the system bus. When a data packet reaches a gateway device, there is a minimal delay of three clock cycles before the data may be transmitted on the module data bus. This delay of three clock cycles is known as the "pipelining." These clock cycles are used to accomplish three tasks: First, the data packet header must be recognized by the local gateway, and analyzed as to whether the address contained therein lies on the module bus of that gateway device; a module bus request must be made; and the module bus access must be granted by the assertion of a module bus grant signal. It should be recognized, however, that this delay may be slightly greater due to other devices accessing the module bus, creating a receiver busy bit (RBB) signal, or due to lost packets, for example. The situation illustrated in the timing diagram 500, uses only two masters on the system bus, and illustrates signals contained within a single module, on a single module bus. However, it should be recognized by those skilled in the art that the same type of scenario could occur between multiple masters, or devices contained on the system bus, and multiple modules and module buses. As stated previously, one embodiment of the present invention allows for system and module bus addresses from 0 to 7. Accordingly, the scenario illustrated by the timing diagram 500 of FIG. 5 is applicable to situations in which more devices both on the system and module buses are accounted for, and wherein multiple module buses are provided for in a manner similar to that described in connection with FIG. 5. Additionally, multiple devices, many more than eight, could be employed within the context of the present invention, and the timing diagram 500 of FIG. 5 would be equally applicable in such a situation, which could be applied as dictated depending on the desired use of the invention.

Multi-Level Single Master Back-to-Back Transfers

Figure 6:
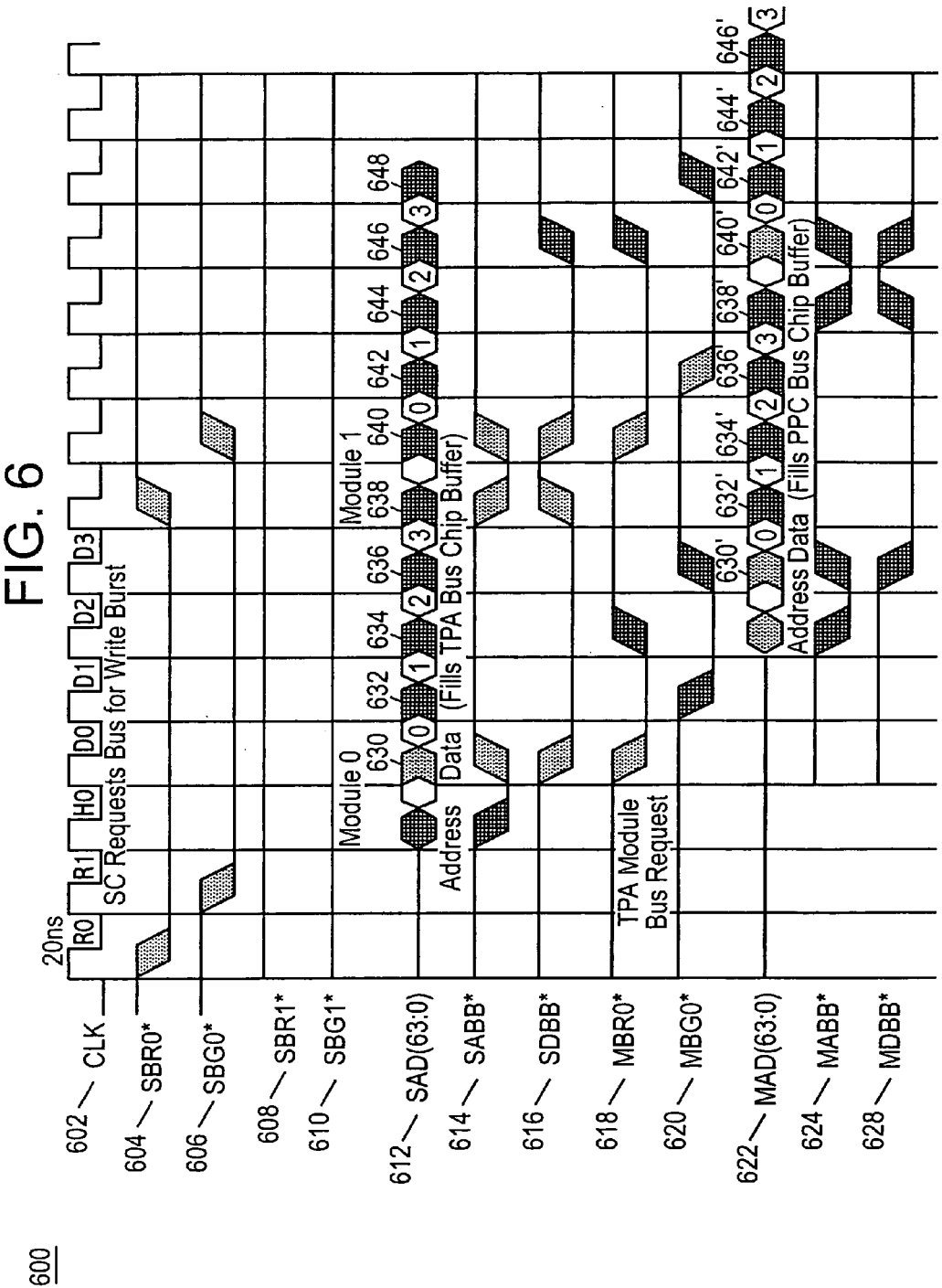
FIG. 6 is an exemplary timing diagram illustrating a two level access scenario with single master.

FIG. 6 contains a timing diagram 600 which illustrates the transaction timing for two-level transfers in a single master back-to-back transfer scenario. This scenario is similar to the one illustrated in FIG. 4, wherein only a single device on the system bus requests access to and writes to the system bus. In the timing diagram 600, a clock signal CLK 602 having a 20 ns period is generated. The clock cycles have identifying information indicators for reference, such as the ones discussed in connection with timing diagram 300 of FIG. 3. It will be recognized by those skilled in the art that a clock cycle of varying length could be used in connection with the present invention, and such a clock cycle need not be limited only to 20 ns.

Various signals, similar to the signals discussed in timing diagrams 300, 400, and 500, of FIGS. 3, 4, and 5, respectively, are used in timing diagram 600. A system bus request signal and system bus grant signal SBR0* 604 and SBG0* 606, respectively, are used in connection with a device connected to the system bus having the address 0, or module 0. This device may be the system controller 104 of FIG. 1, for example, which has the priority address 0. Additionally, system bus request and bus grant signals SBR1* 608 and SBG1* 610, respectively, are associated with the device having the system bus address 1. The system address data bus signal SAD(63:0) 612 is used to transmit data packets, and the signals SABB* 614 and SDBB* 616 are asserted when the header and data words of the data packets are transmitted, respectively.

Various signals associated with the module bus are also provided. A module bus request signal MBR0* 618 associated with the device having address 0 on the module bus is provided for. A module bus grant signal MBG0* 620 also associated with the device having the module bus address 0 is provided for, which when asserted grants access to that device on the module bus. A module address data bus signal MAD(63:0) 622 indicates the transfer of the various data packets on the module bus. The signals MABB* 624 and MDBB* 628 are asserted when the header and the data words of the various data packets on the module bus are transmitted, respectively.

The situation illustrated in the timing diagram 600 is similar to the one illustrated by the timing diagram 500 of FIG. 5, with the main difference being that only one device requests access and is granted access to the system bus. Therefore, there is no delay introduced between the two packets, which both originate from the system bus device having address 0, or module 0. Therefore, the packet header 630 and the data words of the first packet 532, 534, 636, 638 are transmitted, immediately follows by the header for the second packet, 640 and the data words contained within that packet 642, 644, 646, 648. As discussed in connection with the timing diagram 500 of FIG. 5, a minimum delay of three clock cycles is introduced between the transmission of the data packets on the system bus and the retransmission of the data packets on the module bus. This delay, or pipelining effect, is introduced because the gateway device, which arbitrates access to the module bus, uses one clock cycle to recognize the header and determine whether or not the packet is addressed to a node on the module bus, one clock cycle to request module bus access, and one clock cycle to receive a bus grant signal. This delay, could be longer if the module bus is being used by another devices when access is requested, for example. Once the access to the module bus is granted by assertion of the module bus grant signal MBG0* 620, the data packets are retransmitted including the header 630' and the four data words 632', 634', 636', 638', and the second data packet containing the data header 640', 642', 644', 646', 648'.

As with the previous timing diagrams herein described, it will be readily recognized by those skilled in the art that the number of devices on the system bus and/or the module bus may be increased according to the desired use of the present invention, and the principles governing the timing diagram 600 would still apply.

Action Codes

Action codes are provided in the packet header word, which are used by the bus interface controller to signal its control device (i.e., the processor). The action codes vary for each type of transaction and are separately described in the sections which describe those transactions.

Transfer Errors

Bus errors are generated and transmitted to the system controller in the event a bus interface or bus gateway cannot transfer its packet to the next destination, such as a bus gateway, or the device bus interface. Such an error may occur when the next address to which a packet is to be transferred is a device receiver that remains busy for more than 40 µs.

A bus time out value of 40 µs is used by bus interfaces and gateways to determine when a receiver is locked up, or has its busy line asserted, indicating that it is busy for an extended amount of time. There are two possible reasons why this would occur. First, if the hardware fails in the receiver bus interface or its host processor, and second, if the event in the destination address references a non-existent module or device. In either case, a time out value should be generated. After a time out interval, the bus interface transmitter must signal an error via an interrupt to its host and transmit a bus error signal in its status word.

There are two ways in which a bus gateway can signal an error. The first is a system bus gateway time out signal (SGWTMO), and the second is a module bus gateway time out signal (MGWTMO). These signals are routed to the system controller and after a 40 µs time out interval is generated, the bus gateway asserts the time out signal active, and drops the packet in order to open stalled buffers.

A board enable mechanism is included with discrete signals from each system bus, or backplane, slot to indicate if the associated module is present in the system. These discrete signals are named BDPRES (6:0) and are routed to the bus arbitration unit within the system controller. Similarly, a device enable mechanism is provided for the module bus with the signals named DVPRES (6:0) located on the bus gateway device.

Bus Transfer Considerations

The two-level bus of the present invention uses a "transmit" methodology. This means that write operations flow in one direction only, and do not require a round trip, making write operations very efficient as they do not wait for any device to respond. A transmitted packet is routed and sent through the bus system without any delay or additional wait states. Conventional bus-read methodologies, however, do not work in this manner because it would require that the bus open a channel from source to destination, which would need to be held open until the operation is complete and all the data had been transferred across the bus. In prior systems, this would cause a significant loss in bus throughput as one or more systems/local buses could potentially be locked in idle during a large part of the read cycle. This transmit methodology provides an efficient communications scheme in a multiprocessor array as the time that any packet takes to cross the bus is minimized, and there are no wait states and no abort or retry operations necessary, as with prior approaches.

Two basic bus commands listed in Table 2 have been created to support control and data transfer operations across the system and module buses. These operations include: control actions (CA) and simple write operation (SW). Control actions include support for interrupts which can be used to signal or alert another processor of a desired event, condition, or request for it to act.

As stated previously, basic write and read functions are provided for by the present invention over the system bus. The write function associated with the present invention is simple and efficient, comprising of a series of packets being sent to their destination in a manner similar to that of email, or may accessed dynamically in a manner such as a direct memory access (DMA) to their destination. Read requests are handled by sending a request to the device wherein the desired data is stored instructing it to transmit the data back to the requester is a block of one or more DMA packets. This system is analogous to a traditional mail-order catalogue system, wherein various packages are desired and requested by a user over the telephone, for example, and the desired packages are then subsequently sent to the user.

DMA transfers can be initiated through the control action methodology, wherein the control action (CA) interrupt may request a DMA transfer. In such a situation, the local processor receiving the CA interrupt will, upon detection of the interrupt, access the associated DMA request in its memory. The processor then checks to see if its transmitter is available, and when the transmitter is available, it executes a request to carry out the DMA transfer requested by the CA interrupt. DMA transfers may be conducted by the bus interface controller, such as the ones illustrated in FIG. 1, for example, after being initiated by the host processor. This technique improves both bus and processor efficiency as the processor is not tied up with moving the data, and the bus is not tied up with waiting for the processor. Therefore, the bus may transfer data under a DMA action, while the processor may be concurrently performing other operations, without waiting for data transfers to be completed. Processor synchronization is accomplished by the local, originating host sending a CA interrupt at the end of the DMA transfer. The local host knows that the DMA is complete when it receives a transmission complete interrupt at its local bus. Once a local host has received a transmission complete interrupt on its local bus, it is then free to begin another DMA transmission. The CA interrupt indicates to the receiving host that the DMA is complete, and which master has transmitted it. To this effect, an 8 bit interrupt vector indicates the type of transfer that has occurred but does not indicate specific addresses where the DMA has stored data. Rather, the receiving host software is pre-programmed to know where the data for a particular type of transfer has been stored.

Processor View of Bus Address

Each processor views the bus interface as in input/output (I/O) device within its own 32 bit address space. The bus interface has a set of control registers and a DMA device, and allows the controlled processor to set up and initiate a transfer via the DMA. The system bus address is mapped out to an extended format comprising a 6-bit device address and a 32 bit device local memory address. The 6-bit device address is encoded with two fields that are three bits wide that describe the destination module (ECE), and one of seven devices within that module. Addresses range from one to seven for each of these fields, and correspond to module and device addresses. The address 0, as mentioned above, is reserved for the primary bus master or gateway to a particular module and any resources provided by it. This 32 bit destination address will be advantageously aligned for 64 bit words, in accordance with one embodiment of the present invention.

Transaction

In one embodiment of the present invention, all transactions of the system bus utilize a common transfer methodology that involves a transmit operation sending one to four words in a packet format. This packet also contains a header, such as the one shown in Table 1, that describes the type of transfer and related control functions associated with it. Thus, the common transfer methodology involves a single hardware transfer type, i.e., the transmitted packet (with two variations, i.e., one or four words per packet may be transmitted at a single time). Using such a methodology simplifies the hardware design by having two variations of a single timing format as shown in FIG. 7.

Figure 7:
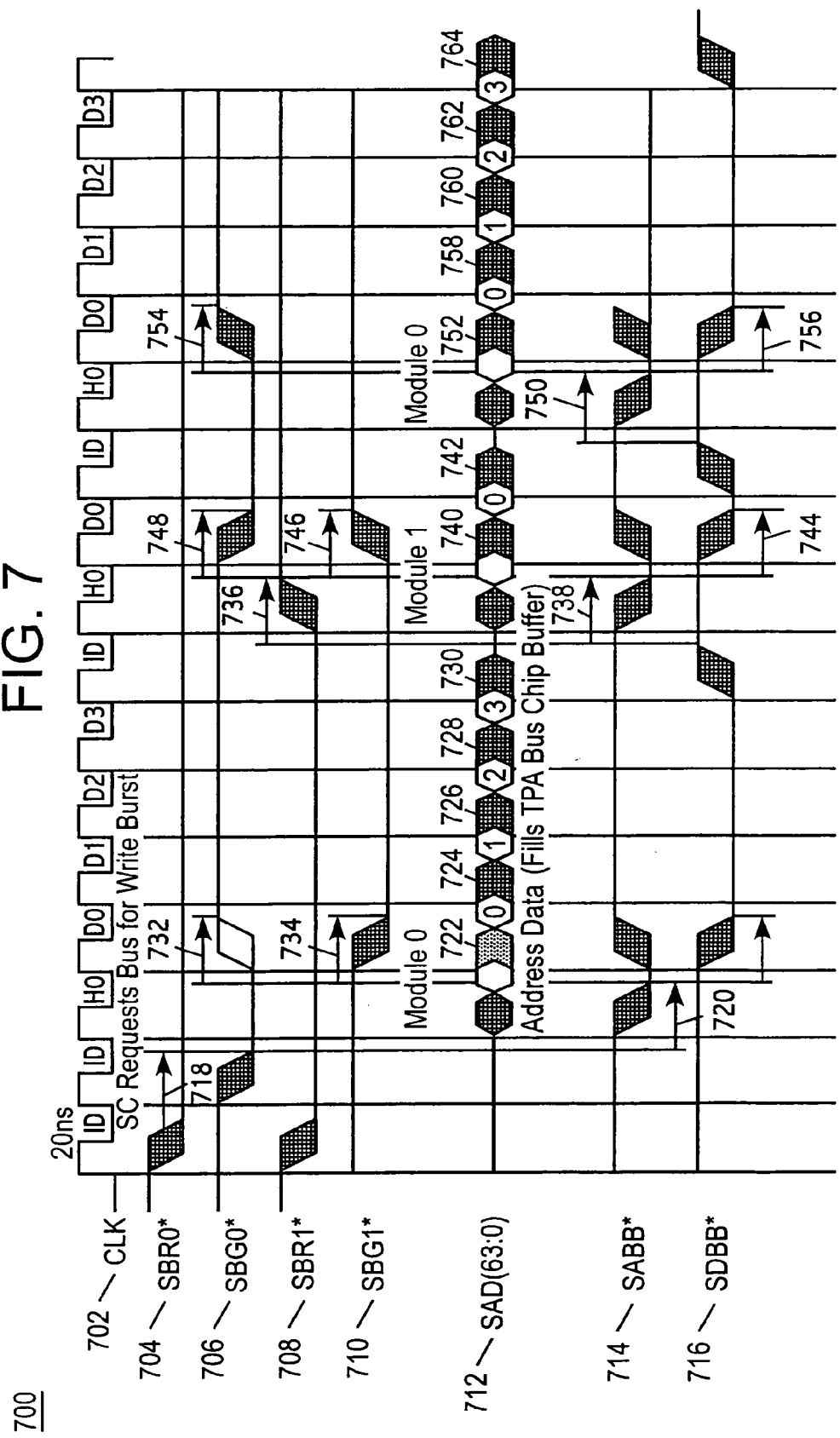
FIG. 7 is an exemplary timing diagram illustrating system bus transfer timing.

In FIG. 7, timing diagram 700 illustrates system bus transfer timing associated with one embodiment of the present invention. In this scenario, a second system bus device having address 1 transmits a Control Action (CA) packet, which is interleaved with data packet transfers from a first system bus device having address 0. In the timing diagram 700, a clock cycle CLK 702 having a period of 20 ns is generated. As with the timing diagram 300 of FIG. 3, the clock cycles have identifying information indicators for reference. It will be recognized by those skilled in the art that a clock cycle of varying length could be used with the present invention, and need not be limited to 20 ns.

Various system bus signals are provided for int he timing diagram 700. The system bus device having the address 0, or module 0, requests access to the system bus by way of a system bus request signal SBR0* 704. The bus arbitrator grants access to module 0 by way of a system bus grant signal SBR0* 706. Similarly, the device having address 1, or module 1, requests access to the bus by way of a system bus request signal SBR1* 708 and that access is granted by way of a system grant signal SBG1* 710. Data is transferred by way of a system address data bus signal SAD(63:0) 712. Signals SABB* 714 and SDBB* 716 are asserted when a packet header, or packet data words, respectively, are transferred.

In the timing diagram 700, both module 0 and module 1 request access to the bus at the same time by way of system bus request SBR0* 704 and system bus request SBR1* 708. Because module 0 has an address with a higher priority, it is granted access first to the bus by way of the system bus grant signal SBG0* 706, approximately one clock cycle after the bus request signal is generated, as indicated by arrow 718. The transfer proceeds normally, as the signal SABB* 714 is asserted one clock cycle after module 0 is granted access to the bus, as indicated by arrow 720. This signal 714 remains active for one clock cycle, during which the packet header 722 for the first packet from module 0 is transmitted. One clock cycle after the signal SABB* 714 is asserted, the signal SDBB* 716 is asserted, and remains active for four clock cycles, during which a complete DMA transaction is completed, during which time the four data words of the data packet, 0–3, 724, 726, 728, 730 are transferred. The system bus grant signal is no longer active one clock cycle after the signal SABB* 714 is asserted, as indicated by arrow 732. Also, One clock cycle after the signal SABB* 714 is asserted, module 1 is granted access to the bus, as indicated by arrow 734, by way of system bus grant signal SBG1* 710.

When the data contained within the first data packet has been completely transferred, the signal SDBB* 716 is no longer maintained active, and one clock cycle later, as indicated by arrow 736, module 1 discontinues its system bus request. Also after one clock cycle, as indicated by arrow 738, the signal SABB* 714 is asserted, and the header 740 of the control action (CA) data packet from module 1 is transmitted during the one clock cycle in which the signal 714 remains active. One clock cycle later the signal SDBB* 716 is asserted and remains active for one clock cycle during which the complete control action transaction of one bit word 742 contained within the packet is transferred. This one clock cycle of delay is indicated by arrow 744. During the same one clock cycle delay, as indicated by arrow 746, the system bus grant signal to module 1 SBG1* 710 is no longer maintained active, and, as illustrated by arrow 748, the system bus grant signal to module 0 SBG0* 706 is asserted.

After the CA packet has been transferred by module 1, control of the system bus is returned to module 0 one clock cycle after the SDBB* 716 signal associated with the transfer of the CA packet by module 1 is no longer asserted, as indicated by arrow 750. After this period of one clock cycle indicated by arrow 750, the signal SABB* 714 is asserted, and maintained active during the tiem in which the header 752 of the second data packet for module 0 is transmitted. One clock cycle later, as indicated by arrow 754, the system bus grant signal to module 0 SBG0* 706 is not maintained active. Also one clock cycle later, as indicated by arrow 756, the signal SDBB* 716 is asserted and maintained active for four clock cycles, during which time four data words of the data packet, 0–3, 758, 760, 762, 764 are transmitted.

As with previous timing diagrams illustrated in FIGS. 3–6, the timing diagram 700 of FIG. 7 is merely illustrative, and could incorporate other features, without departing from the principles illustrated therein. For example, only two devices on the system bus are illustrated as accessing the system bus. However, many more devices could operate in a similar manner on the system bus as provided for by the principles of the present invention. For example, system bus devices having addresses 0–7 are provided for by one embodiment of the present invention. However, devices numbering many more than eight could be utilized in a configuration such as the one shown in the timing diagram 700 of FIG. 7, and are intended to be encompassed within the scope of the present invention. Additionally, multiple bus levels, such as module buses or other sub-buses could be utilized with a similar arbitration scheme, such as the one shown in timing diagram 700 of FIG. 7.

In this manner, bus traffic is managed by the hardware protocol scheme such that, through the use of the receiver busy line, master access of the bus will be delayed until a path is cleared to the receiver on the same local segment of that bus. This guarantees that no wait states will ever be encountered in a bus transfer since the transmitter is assured that the receiver is capable of receiving a packet with no delay.

The hardware protocol scheme for managing bus traffic is effective in preventing delays associated with the following types of transfers: a simple write involving a DMA transfer from one master to another; a control action interrupt; a control action processor request; and a control action set broadcast mask. The hardware protocol scheme does not, however, prevent the bus from delays or hangups for a control action requesting read transfer type, which is optional for download verification only. For such a transfer type, the hardware protocol scheme cannot protect the bus from hangups or delays and a software protocol must be used. These transfer types are not recommend for general system operation but may be useful during initialization. Software protocol, as used in the present invention, refers to software executive control that regulates the number of requests that can be present on a bus at any given time.

One important aspect of the system of the present invention is that devices are limited when transmitting data of a size that requires multi-packet transmissions, in that they may only be involved in one of these multi-packet transmissions (Transmit DMA) at a time. However, devices may receive packets of any nature (e.g., DMA or control action, for example) from other devices in the system including single and multi-packet transfers. Additionally, devices may also perform single packet control action transfers at the same time as a multi-packet transfer currently in progress.

Simple Write

Simple write operations, such as the simple write operation outlined in Table 2, are source initiated transfers of a number of packets, denoted TSIZE and of four 64 bit words. A destination address is taken from the header memory address bits (31:0) (DMAD), outlined in Table 1, and indicates the storage location in the destination device memory map carried via the source host bus interface carries out the transfer of TSIZE packets by sending successive packets until all TSIZE packets have been sent. The DMAD is then incremented by four after each packet has been sent. The action codes listed in Table 3 below are applicable to the simple write operation, and serve to inform the receiving device of the start and end of packets of the overall transfer, which may be a series of 1 to 4096 packets in one embodiment of the present invention. For single packet transfers, both the start of write transfer bit (SOWT) and the end of write transfer bit (EOWT) should be set.

TABLE 3

| Action Code | Code | Value | Description |
| --- | --- | --- | --- |
| Start of Write Transfer | SOWT | xxxx1 | Informs destination device that this is the first packet of the overall transfer. |
| End of Write Transfer | EOWT | xxx1x | Informs destination device that this is last packet of the overall transfer. |
|  |  | xx0xx | Not Used - Set to Zero |
| Broadcast Mask | BCT | nnxxx | Broadcast Mask - Substitute for (nn) A = 00 B = 01 C = 10 D = 11 |

Requested Write

Requested write operations, such as the one outlined in Table 2, are initiated by the destination device by way of a read request (RQ) control action. These operations are performed advantageously in an optional hardware diagnostic mode. The requested device responds by sending a series of one or more packets until all of the data located in memory from the requested address location through the number of four word data packets specified by the transfer side (TSIZE) have been sent. The destination memory address is incremented by four each time a new packet is sent so that the packets always have the correct address for the data words being sent. The action codes listed in Table 4 below are the action codes associated with the requested write operations.

TABLE 4

| Action Code | Code | Value | Description |
| --- | --- | --- | --- |
| Start of Requested Transfer | SORT | xxxx1 | Informs Read Requesting Device that this is the first requested packet |
| End of Requested Transfer | EORT | xxx1x | Informs Read Requesting Device that this is the last requested packet |

Control Actions

Control Action Transaction Types Support Specialized Operations That Are Needed for Administration and Support of the Bus System and Inter-Processor Coordination and Synchronization.

Control action packets are always made up of a header and a single data word. The action code of the control action defines the type of control action to be taken. Table 5 below outlines the various control actions available.

TABLE 5

| Action Code | Code | Value | Description |
| --- | --- | --- | --- |
| Generate Interrupt | GINT | nn000 | Generate Control Action Interrupt. Vector = Bits 7:0 of header |
| Single Word Write (Not Implemented) | SWW | nn001 | Write a single word packet to the destination given in the header. |
| <spare> |  | 00010 | Reserved for future use |
| Requested Read (Optional for Download Verify Only) | RRD | 00011 | Requests Destination Device to perform a DMA transfer of a specified range of its local memory back to the originating device |
| Clear Reference Counter | CLREF | nn100 | Signals Bus Interface to Pulse a clear to the Reference Counter associated with the destination device. Can only be commanded by System Controller (Modadd = 0) Upon HW Reset Ref Counter is cleared to zero. |
| Drive and Hold Processor Reset | CPUDR | nn101 | Signals Bus Interface to Drive and Hold Processor Reset such as would be needed for code download. Can only be commanded by System Controller (Modadd = 0) |
| Release Processor Reset | CPURR | nn110 | Signals Bus Interface to Release Processor from reset such as would be needed to start execution of download code. Can only be commanded by System Controller (Modadd = 0) |
| Set Broadcast Mask | SMB | nn111 | Data Word Bits 3:0 indicate which broadcast masts are to be selected. A = bit 0, b = bit 1, c = bit 2, D-bit 3 Can set none, any, or all three bits. Has no effect on Gateway since it simply passes a valid broadcast address. Initially all are disabled. |

In Table 5 above, the action codes and their abbreviated code format are abbreviated with their associated bit values. The bits "nn" pertain to a broadcast mask where A=00, B=01, C=10, and so on, and represent wildcard values when the modular device address to be accessed is 7.

Control Action Data Word

The control action data word is unique for each type of action code. The data words for each control action listed in Table 5 above, are described below.

Action nn000: Generate Interrupt (TINT)

The generate interrupt action causes an interrupt to be transmitted to the host processor for the receiving bussed interface vice. The data word for the interrupt packet is not used and should be discarded. In one embodiment of the present invention, the 15 bit word is stored in the interrupt buffer which includes the source interrupt address (13:8), the interrupt factor (7,0), and the valid flag (14). This information can subsequently be read by the processor.

Action 00001: Single Word Write (SWW)

The single word write action instructs the destination device to store the selected data word at a specified address. In one embodiment of the present invention, this mode is optional and is not implemented.

Action 000011: Requested Read (Optional—For Download Verification Only)

The requested read action causes the receiving bus interface to respond by transmitting data from a range of its local memory to a destination device making the read request. The destination address to which the data is to be stored in the local memory of the requesting device is specified in the DMAD portion of the header along with the number of packets in TSIZE. The source device local address for the data is stored in the control action data word.

This requested read action is optional, and is for download verification only. The requested read action cannot be managed by hardware protocol only, as such management could jam the receiver of a requested host some time if more than one read request has occurred and a previous request is delayed in the receiver. Therefore, according to one embodiment of the present invention, this feature should not be used by the operating software other than for purposes of verifying downloaded codes during initialization. In a further embodiment, this feature may not be implemented at all so as to implement any potential delays within the receiver and prevent any need for software arbitration.

Action 00100: Reset Reference Counter

The reset reference counter action allows an external device, such as the system controller shown in FIG. 1 to synchronize all devices, modules, or processors within the system to a common timing reference. This is accomplished by providing counters on each device and a common clock that can be started or stopped at will. The reset reference counter control action allows an external device to clear the timing counter of all the devices in order to synchronize them to a common reference clock that must be stopped during this process until all device counters have been cleared.

Action 00101 and 00110: Reset Controls

The resent control actions are provided to allow the system controller, such as system controller 104 shown in FIG. 1, to be able to reset any of the processors in the system. For these control actions to be employed properly, it is necessary that the source device address has an MAD=0 to restrict this function to receiving commands only from the system controller.

Action 00111: Set Broadcast Amounts

The set broadcast mask action informs the bus interface or bus gateway at the destination address to enable selected reception of a broadcast using specified masks, such as A, B, C, and/or D. During a broadcast transmission, all devices on the given bus segment which have been addressed with the module or device address 7 will be selected to receive a broadcast message. However, this broadcast message will only be received if the mask is enabled. The arbitration module, of course, has no way of knowing what mask is in place, and will wait for all devices on a particular bus segment to become available before sending the packet.

Broadcast

As stated above, the system bus, such as the system bus 102 shown in FIG. 1, supports broadcast messages which originate from a single transmitter but are received by multiple devices or modules. To provide this functionality, the module or device address 7 is reserved as the broadcast address. This address signifies to a local server that all receivers are to receive the particular data addressed with the broadcast address 7. To guarantee that all devices receive the interrupt, the arbitration unit must wait until all busy lines, specified by SRBB (6:0) and/or MRBB (6:0), indicate that their respective receivers are available to receive transmissions. Bus gateway devices do not respond to address 7 on the system bus, but respond only to their own valid module address. On the module bus, such as module bus 122 shown in FIG. 1, the gateway device will repeat address 7 or any other address that is not its own module address to the system bus, thereby supporting such a broadcast transmission. When the broadcast transmission has been sent, the receivers will selectably acquire packets based upon the broadcast mask valuing A, B, C, or D associated therewith. Using this broadcast message address 7 methodology, several options for employing broadcast operations exist.

The following are examples of broadcast operations that consider a system controller (SC), multiple temporal processor modules (TP), and other modules having a single device and no gateway. The first example is when an SC, TP, or other module sends a packet addressing module device 7. In this first case, the packet will be routed to all modules on the system bus with a single device, and will not be sent to TPs. The second example is when an SC, TP, or other module sends a packet addressing another TP module address with device 7. In this second case, the packet will be routed to all devices on that TP module. The third example is when a device on a local TP module bus addresses device 7. In this third case, the packet will be routed to all other devices on that local TP module bus. It should be noted that TP modules, in accordance with exemplary embodiments of the present invention, do not respond to a module broadcast address 7 because of limitations of the gateway. Also it should be noted that devices will only accept packets having masks A, B, C, or D to which they have been sensitized.

(1) System Bus Address Points to TP Module, Device Address is 7

In the first case, where the system bus address points to a TP module and a device address is 7, the transfer across the system bus to a TP module address is a standard transfer. Once the packet has arrived at the destination gateway, the gateway arbitration unit clears the open module bus by waiting for all receivers to clear their respective busy states, and then sends a broadcast message to all receivers on the module bus.

(2) Modular Bus Address Points to Module Address 7, Device X

In the second case, where the module bus address points to module address 7 and to a random device, device X, the broadcast is from a TP master to all of the masters on the system bus, excluding other gateways. The device address is a "don't care" address, designated "X" since device addresses are only pertinent to module bus receivers and none would be referenced with this transaction, it is not necessary to specify a device address in a broadcast transmission from a TP master to all masters on the system bus. In this case, the transmitting TP gateway will wait for all module bus busy lines to clear, except for the TP gateways, and will then send a broadcast message to the device receivers.

(3) Module Bus Address Points to Another TP and the Device Address is 7

In the third case, the module bus address points to another TP and the device address is 7. In this case, the broadcast is routed through the transmitting TP gateway across the system bus to the receiving TP gateway addressed by the TP module address. The broadcast data will then be broadcast by the gateway to the destination TP local module bus. The gateway will wait for all local receivers to clear busy signals before sending the broadcast packet.

(4) System Bus Points to Module Address 7, Device X

In the fourth case, the system bus points to a module address 7, and no device address is given. As such, the broadcast transmission is performed from a system bus master to all other system bus receivers, excluding bus gateways. The device address is irrelevant, and designated X as device addresses are only pertinent to module bus receivers and none will be referenced for this transaction. Module bus points to local module address, device 7

In this fourth scenario, the module bus points to a local module address using the device address 7. This broadcast transmission is from the local module device to all other devices on the local module bus excluding the gateway.

It is important to note, that one of the aforementioned scenarios associated with broadcast data methodology options does not properly function in one embodiment of the present invention. Specifically, the option of having the system bus broadcast to all TPs does not work as gateway devices, according to one embodiment of the present invention, are programmed to ignore the module address 7 on the system bus. It will be appreciated by those skilled in the art, however, that such an option and mode of operation is within the scope of the present invention, and could be implemented with minor hardware or software adjustments.

Data Flow Management

In one embodiment of the present invention, the bandwidth of the system bus varies for DMA operations from 106 to 128 Mb/s. These figures are for DMA transfers depending on whether a single master is used for transmitting, or whether two masters are used in an interleaving configuration. The effective transfer weight is multiplied by the number of bus segments, assuming that no transmissions cross gateways. Therefore, for the system illustrated in FIG. 1, wherein one system bus 102 and three module buses 122 are used, the overall DMA bandwidth could be as high as 512 Mb/s with three temporal processors. Control actions, including interrupts, are much slower due to the packet overhead, such as headers for example, and are generally transmitted at a speed of about 80 Mb/s on any bus segment. However, it should be noted that the DMA packets vastly outnumber the control action packets, thereby allowing the bus to run with relative speed and efficiency.

The transfer rate for each master is a function of how many other masters are attempting to access the system bus at a time and how heavily they are sending data across the bus. When the bus is heavily loaded, performance will be degraded due to various factors. Some of these factors include arbitrations times and receiver busy delays.

Arbitration time effects the transfer rate when all masters are trying to gain access simultaneously to the system bus, and the time for any one master to gain access would normally be the time required for seven packets plus arbitration time for the system bus and up to the time required for four packets plus arbitration times for the module bus. However, if one of those masters is the system controller or the gateway that can access the bus every other packet cycle, then the system bus access time can be as high the time required for twelve packets plus arbitration times and the time required for the module bus can be the time required for six packets plus arbitration times.

Accordingly, the worst case arbitration times on a local segment, assuming that the receiver is available, indicate that any given master on the system bus may have to wait for up to 4.05 µs. This is calculated by multiplying 50 ns times the product of 6 and 12, or 72. The worst case scenario for the arbitration time in a local segment for a module bus indicates that the wait time may be as long as 1.8 µs. This is calculated by multiplying 50 ns by the product of 6 and 6 or 36.

Additional delays can be accumulated by arbitration time across gateways to access another bus system. For example, once a master on the system bus has gained access after 3.05 µs and transmitted a packet to the gateway, the gateway may then take an additional 1.55 µs to be transferred to the destination receiver. This results in a total packet transfer time of up to 6.1 µs for crossing a single gateway, and up to 9.15 µs for crossing two gateways. The best case scenario time for such a packet to transfer would be approximately 800 ns. This is calculated by multiplying 50 ns by the sum of 5, 6, and 5, or 16. The transfer rate could still be as high as 4 MHz due to the pipelining through the bus gateway and the simultaneous operation of the system and module buses, which is calculated by taking the inverse of the product of 50 ns and 5.

Additional delays are introduced when a receiver is busy. The receiver buffer supports up to four DMA packets and 14 interrupt packets being temporarily stored while waiting for access to the local host bus for storage into memory, according to one embodiment of the present invention. For the temporal processor (TP), the receiver is expected to be able to accommodate data as quickly as the speed of the bus, and therefore the MRBB* busy lines should never be asserted. Data, therefore, should flow at the transmission rate of the local PPC memory, or equivalent memory, associated with the processor used. When such delays are present, for the sensor interface and system controller the receive rate could slow to about one half of the bus rate, which according to one embodiment of the present invention would be approximately 10 MHz. It will be recognized by those skilled in the art, however, that the speed of a system experiencing significant delays will also increase as faster processor become available, and are used in the present invention.

Table 6 below summarizes the expected transfer rates for the system bus under various conditions, and takes into consideration limitations indicated above that cause system delays. It should be noted, that the column designated "DMA Single System" has performance values that are the total bandwidth of all masters in all rows, whereas the other columns express rates on a "per master" basis, except for row 1, which corresponds to total bandwidth.

TABLE 6

| | Control Actions | DMA Multiple Master | DMA Single Master | DMA Single System | Units |
|---|---|---|---|---|---|
| Segment Bandwidth | 53 | 106 | 128 | 512 | Mbyte/Sec Total Rate |
| Local Module Bus (All Masters Xfering) | 8.9 | 17.7 | 21.3 | 512 | Mbyte/Sec Per Master |
| Local System Bus (All Masters Xfering) | 4.4 | 8.9 | 10.7 | 512 | Mbyte/Sec Per Master |
| Cross 1 Gateway (All Masters Xfering) | 4.4 | 8.9 | 10.7 | 128 | Mbyte/Sec Per Master |
| Cross 2 Gateway (All Masters Xfering) | 4.4 | 8.9 | 10.7 | 128 | Mbyte/Sec Per Master |
| Local System Bus System Bus Receiver | 2.2 | 4.5–8.9 | 5.4–10.7 | 256 | Mbyte/Sec Per Master |
| Cross 1 Gateway to System Bus Receiver | 2.2 | 4.5–8.9 | 5.4–10.7 | 64 | Mbyte/Sec Per Master |

In Table 6, the figures expressed in the column "DMA Single System" account for one system bus running in parallel with three module buses. Latency expressed in rows 4 and 5 under the headings "Cross 1 Gateway" and "Cross 2 Gateway" is the sum of the local module, gateway, and system bus packet transfer time, which is approximately three times longer than that of local transfer for a situation using one gate and five times longer than that of a local transfer for a system using two gates. This is true even though the transfer rate is the same as the local system bus due to pipelining.

The value of 128 megabytes per second in the intersection of the "DMA Single System" column and the "Cross One Gateway" row in Table 6 would be 384 Mb/sec if time for crossing one gateway and two local transfers in parallel are accounted for. The value in the same column, in the row immediately below, of 128 Mb/sec would be 256 Mb/sec if time to cross two gateways and one local transfer in parallel is accounted for.

It should be noted that the values in Table 6 expressed in the cells at the intersection of rows "Local System Bus System Bus Receiver," and "cross 1 Gateway to System Bus Receiver," and the column "DMA Single System" correspond to receivers working at one half the bus rate at a corresponding speed of 10 Mb/sec, in accordance with one embodiment of the present invention. It should also be noted that the value ranges expressed in the cells at the intersection of the columns "DMA Multiple Master" and "DMA Single Master," and the rows "Local System Bus System Bus Receiver" and "Cross 1 Gateway to System Bus Receiver" depend on the percentage of transfers which are continuously sent to the sensor interface (SI) or the system controller (SC) receivers.

It should further be noted that broadcast packets will have a limited impact on further slowing the transfers since the TP receivers never become full and the SI/SC receivers slow rates by 50 percent only on transfers that are continuously destined to the same SI/SC receiver. From the times listed above in Table 6, it can be discerned that a bus time-out of 40 μs should be adequate to cover the longest possible transfer time. In fact, it should exceed the longest possible transfer time by a factor of 4. Therefore, if this length of a time out occurs, then it can be safely assumed a hardware failure has occurred or the software is generating an access request to a non-existent device.

Packet Buffering and Transfer Methodology

In accordance with one embodiment of the present invention, whenever a packet is received by a bus gateway or a bus interface device, it must immediately be transmitted into an internal buffer to be held and await a retransmit command. These buffers are provided for each direction of transfer and work independently to buffer packets transmitted in both directions, such as in the transmit and receive directions. In order to minimize the possibility of aborting a transmission packet, bus devices provide first in first out (FIFO) storage buffers that are at least 4 packets deep in both directions.

Figure 8:
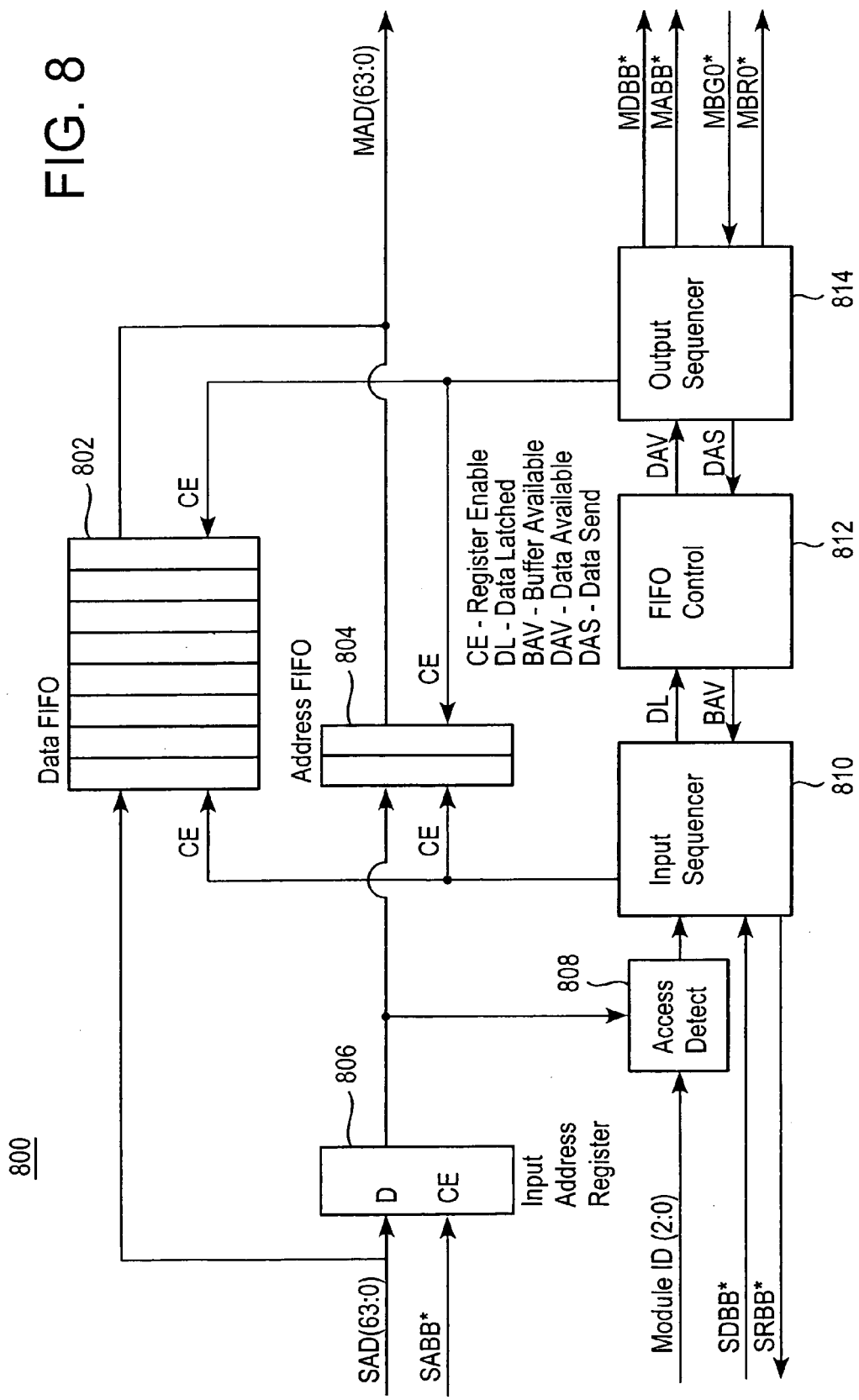
FIG. 8 is an exemplary block diagram illustrating a bus gateway packet buffer system.

This buffering methodology of the bus gateway device, such as bus gateway device 120 shown in FIG. 1, is implemented in the bus gateway buffer block diagram 800 shown in FIG. 8. In the bus gateway buffer block diagram 800, a bus gateway packet buffer concept is illustrated for transferring data from the system bus to memory buffers and to the module bus. In the bus gateway buffer block diagram 800, a data buffer data FIFO 802 is used to process and buffer packet data from the system address data bus signal SAD (63:0) using the first in first out data processing technique. Additionally, addresses are input using FIFO logic in the address FIFO buffer 804. The addresses are input from the system address data bus signal (63:0) through the input address register 806, and access to these addresses is detected by the access detect mechanism 808. All inputs are processed by the input sequencer 810 and FIFO data is controlled by the FIFO control unit 812. The output sequencer 814 sequences various outputs, such as module address signals and module bus grant signals.

The same techniques illustrated in FIG. 8 apply for bus interface devices, such as the bus interface devices 128 of FIG. 1, as well as the bus gateway device, except that one of the interfaces is a processor rather than a bus. Bus gateway devices as illustrated in block diagram 800 of FIG. 8 have been reduced to a simple, buffered, bidirectional packet repeater configuration. They must be capable of discriminating between module and device addresses in real time, and of moving packets through the buffer with no delays or busy signals unless the pipeline stalls due to a busy destination. For this purpose of discriminating between addresses in real time, the bus gateway devices must store incoming packet addresses in buffers, until it can be determined whether or not the pocket is addressed to that device, or an address within that module. In this manner, the gateway device does not lose any information while determining if a pocket is addressed to that device.

System Bus Support Devices

Within the system of the present invention, multiple devices are used for interfaces with the bus and the various modules devices contained within the system. Some such devices include, for example, processor bus interface devices and bus gateway devices.

Processor Bus Interface Devices

Figure 9:
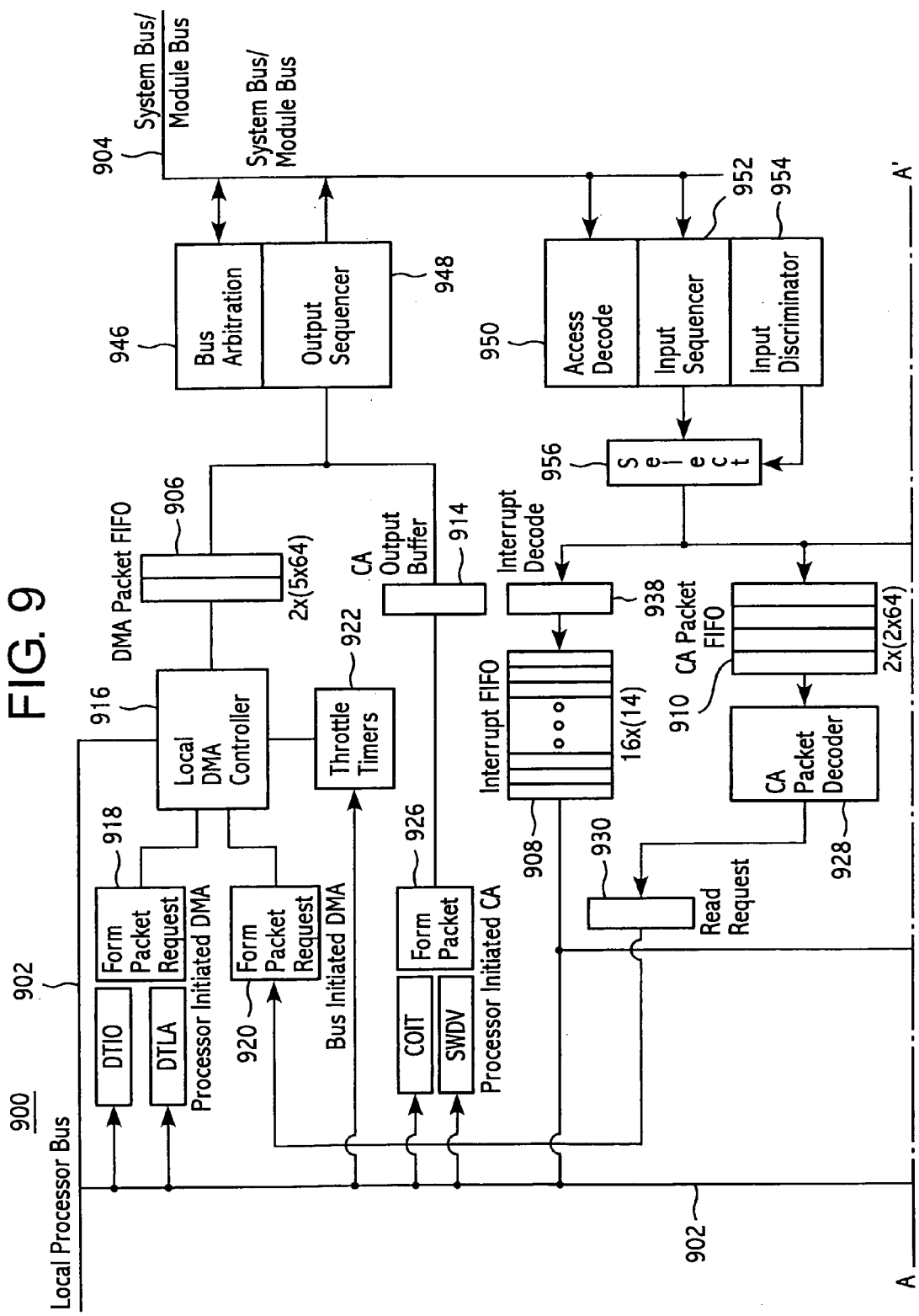
FIG. 9 is an exemplary block diagram illustrating an exemplary bus interface of the present invention.
Figure 9:
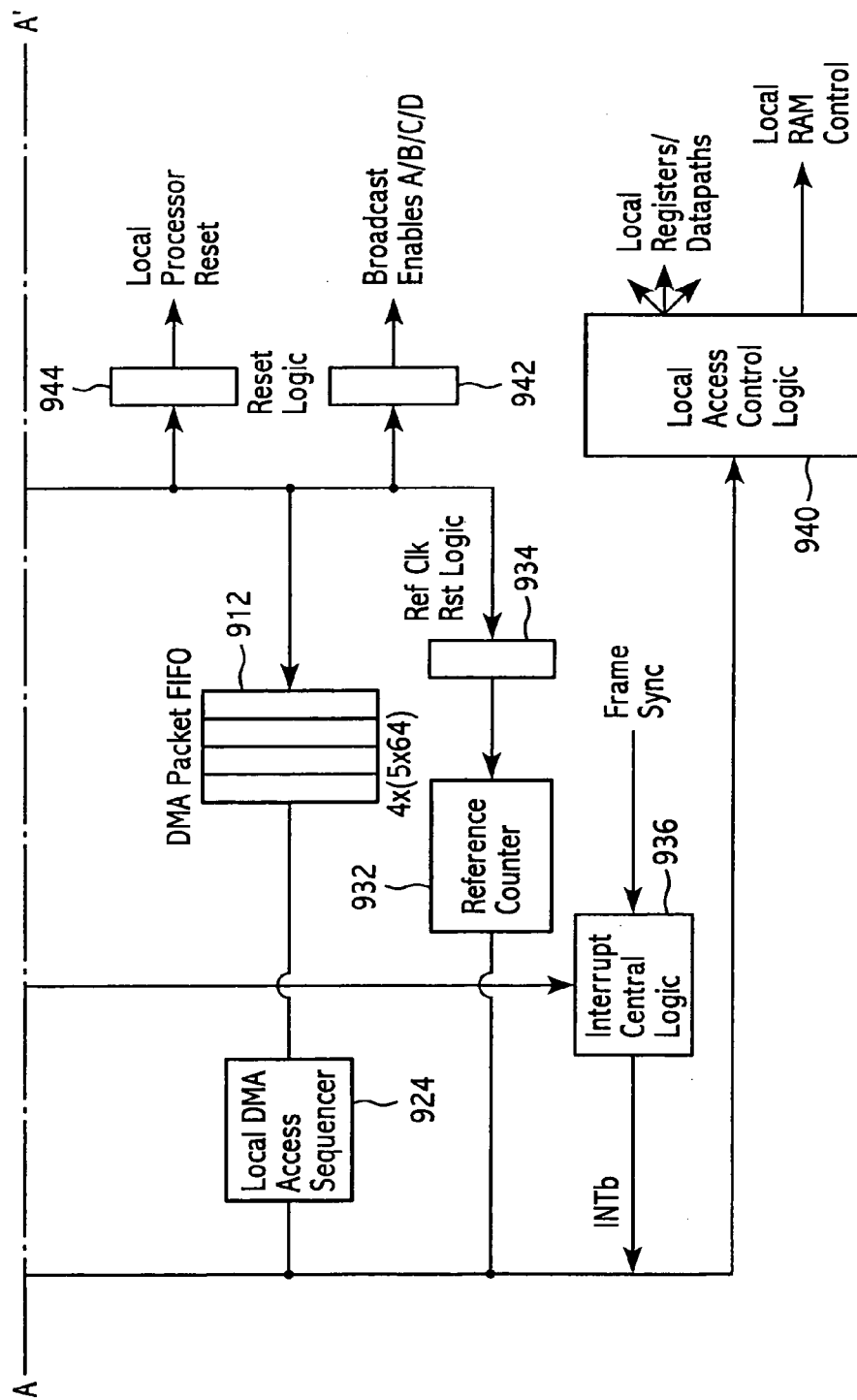

According to one embodiment of the present invention, a bus interface device is responsible for managing all transfers between the processor and the system bus. In FIG. 9, a block diagram of this interface device 900 is shown. This interface device and methodology are the subject of copending patent application Serial No. 09/955,966, filed on even date herewith, entitled "System Bus Transceiver Interface," which is hereby incorporated by reference in its entirety herein. The major function of the bus interface shown in the block diagram 900 is to utilize a transmitter and receiver that operate between the local processor bus 902 and the system bus or module bus 904. The bus 904 may be either the system bus 102 or the module bus 122, shown in FIG. 1. The local processor bus 902 is the bus connecting the bus interface device 128 to components within the same node of the module, such as processors and memory, or, in the case of the sensor interface, internal processors and memory. The interface illustrated in the block diagram 900 of FIG. 9 provides the necessary functions to meet the requirements of the system illustrated in FIG. 1, for example. This bus interface also includes support DMA operations and control actions, as used in embodiments of the present invention.

Within the bus gateway buffer block diagram 900, several packet buffers are illustrated, such as the DMA packet FIFO buffer 906, the interrupt FIFO buffer 908, the CA packet FIFO buffer 910, and the DMA packet FIFO buffer 912. In FIG. 9, each of these buffers has a value below which is associated with the size of packets, and/or interrupts stored within the various buffers. It will be recognized by those skilled in the art, however, that these numbers may change according to the processor capabilities within the overall system and bus data transfer speeds. Also included is a CA output buffer 914 for processing various control actions.

Associated with the DMA packet transfers between the local processor bus 902 and the system bus 904 and the DMA packet FIFO buffer 906 is a local DMA controller 916 which processors form packet requests from components 918 and 920. These components that process form packet requests 918 and 920 process processor initiated DMA operations from control registers DTIO and DTLA, and bus initiated DMA operations, respectively. The local DMA controller 916 is also operably connected to a single or group of throttle timers 922. The DMA packet FIFO buffer 912 is connected to a local DMA access sequencer 924 that is connected to the local processor bus 902. A form packet device 926 is connected to the CA output buffer 914 for processing processor initiated CA operations from the two registers: COIT and SWDV for initiating CA operations.

Connected to the CA packet FIFO buffer 910 is a CA packet decoder 928. This CA packet decoder 928 is also connected to the form packet request 920 for bus initiated DMA operations through a read request device 930. A reference counter 932 is connected to the local processor bus 902 and by way of component 934 is operable to transmit reset request signals and transmissions.

An interrupt control logic device 936 is connected to the interrupt FIFO buffer 908 and the local processor bus 902 for controlling interrupt transmission and interpretation. Also for decoding interrupts an interrupt decode component 938 is connected to the interrupt FIFO buffer 908. Controlling all of the processing events within the bus interface 900 is the local access control logic 940. As illustrated by the arrows leaving the right hand side of the local access control logic 940, access is granted thereby to local registers and data paths, and to local RAM control.

Also provided in the bus interface 900 is a broadcast enable device 942 that enables the use of the various broadcast masks A, B, C, and/or D. A local processor reset device 944 containing reset logic is also connected and operable for transmitting various reset requests.

The system bus 904 is connected to the bus interface by way of a bus arbitration element 946, an output sequencer 948, an access decode device 950, and an input sequencer 952. Connected to the access decode device 950 and the input sequencer 952 is an input discriminator 954, which in connection with the input sequencer 952 is connected to a selection device 956 for selecting the input to be sequenced and processed by the interrupt FIFO buffer 908, the CA packet FIFO buffer 910, the DMA packet FIFO 912, or the reference counter 932.

The major functions of the interface 900 illustrated in FIG. 9 include processing commands between the local processor bus and the system or module bus by way of various modules and devices as outlined below.

System/Module Bus Transmit and Receive

The transmitter and receiver sections of the system bus interface are two independent channels that can run completely in parallel. Within each of these sections, two basic types of operations are supported including DMA operations and control operations.

DMA operations involve the automatic movement of data between the host processor memory to and from packets transmitted or received from the system and/or module bus. DMA operations occur as a result of either a processor request, or from packets received from the bus. Processor requested DMA transfers include simple write (SW) functions. Bus requested transfers include, for example, the optional requested write (QW) mode.

Control operations include transfers such as transmission of reception of specialized single-word packets. Control operations can occur as a result of either a processor request, or packets received from the bus. They can affect the host processor memory or the bus interface control registers. The control actions (CA) commands are processor initiated commands that affect the receiving bus controller and/or its host processor. Processor initiated operations involve, for example, simple write requests (SW) and control action (CA) operations. The SW operation, for example, results in a DMA transaction being initiated to transfer a block of data to the destination. The CA operation, on the other hand, involves a single packet write operation to the system bus. For processor initiated DMA operations, such as the type received by the form packet request device 918 in FIG. 9 from the control registers, only a single transfer at one time may be in progress, and the processor cannot initiate another until the current transfer has been completed.

Control actions (CA) can be used in parallel with the current DMA transaction that may be in progress, and are considered higher in priority. Therefore, the control action packets will preempt the next DMA packet to be transferred over the bus and will be immediately sent upon completion of any current packet transfers as illustrated in FIG. 7. This occurs only after a clear channel on the bus has been granted by a bus grant signal. After the CA packet is sent, the preempted DMA transfer will resume operation under normal operating conditions.

Bus initiated operations, such as the type received by the form packet request device 920, involve, for example, reception of a simple write (SW) and control actions (CA) and the transmission of optional requested write (QW)

actions. For SW and many CA operations, the packets are routed to the appropriate buffer for the respective operation. SW and QW operations, in accordance with one embodiment of the present invention, will be sent to a DMA packet buffer that can hold at least 4 packets, or is "4 deep," such as the DMA packet FIFO buffer 912. CA interrupts are routed to an interrupt buffer having positions for at least 16 interrupts, or is "16 deep," such as the interrupt FIFO buffer 908 of FIG. 9. CA reset or broadcast modes, on the other hand, according to one embodiment of the present invention, will have a direct effect and will not require buffering. The optional CA requested read and simple write functions will each have a buffer that is 2 deep, such as CA packet FIFO buffer 910, and DMA packet FIFO buffer 906.

DMA operations are separated from other packets upon receipt, and placed into the interrupt buffer, such as the interrupt FIFO buffer 908. The hardware system balances the flow of DMA by regulating DMA operations with receiver busy indications to the bus arbitrators and thereby prevent overflow of the receivers. Since the bus interface handles DMA operations by stealing cycles on a local host bus, they require little host intervention, except to start the operations, thereby allowing the bus system to maintain effective transfer rates.

Control action (CA) interrupts are separated by other packets upon receipt and placed into the interrupt buffer, such as the interrupt FIFO buffer 908. The design of the operational software, in accordance with one embodiment of the present invention, manages the total number of interrupt packets being sent at any given time, such that the buffer 908 containing 16 locations will not become full. In the event that it does become full, the local receiver will transmit an indication that it is busy to the arbitration unit, and all traffic, such as all DMA and CA operations, will not be able to reach that device until the interrupt buffer is no longer full.

CA interrupts are dependent on local host processor intervention for each interrupt. The local host processor, such as the local access control logic 940, must read all CA interrupts at a rate such that the interrupt buffer 908 does not become full. CA requested read actions (CA-RRD) are designed to involve setting up an optional requested right (QW) operation, which will initiate a transmit DMA operation. According to one embodiment of the present, CA-RRD operations should not be used for general software operations as they can take a long time to complete for packets of large transfer sizes. A CA-RRD action used to set up a requested write (QW) function may be expressed by the designation CA-RRQ. If more than one CA-RRQ action is sent to the receiver, its input buffer could potentially fill or halt, due to unanticipated processing delays, thereby halting all bus traffic. Such a halt in bus traffic would result in device and gateway transmitter time out signals being generated. Therefore, any CA-RRQ actions should only be used to verify downloaded code or carry out test operations.

The transmitter of the bus interface 900 has three sources of access: the processor initiated DMA; optional bus initiated DMA, such as a requested read operation; and processor initiator control actions (CA). Processor initiated DMA operations and bus initiated DMA operations are received by the form packet request devices 918 and 920. DMA operations are set up through a series of control registers that form a packet request to the DMA controller. These control registers, in accordance with one embodiment of the present invention, correlate to the control registers DTIO and DTLA that provide the form packet request device 918 with processor initiated DMA. Once DMA operations have been passed from the packet request devices 918 and 920 to the DMA controller, the controller then carries out transfers from local processor memory, build packets, and stores them in the DMA packet FIFO buffer 906. From this buffer 906, packets will be sequenced to the bus by the arbitration and sequencer logic, such as the bus arbitration device 946 and the output sequencer 948. The DMA packet FIFO buffer 906 provides buffering for two complete five word DMA packets, according to one embodiment of the present invention.

CA operations are sent directly to the CA output buffer 914 where they will be sequenced to the bus by the bus arbitration device 946 and the output sequencer logic device 948. As such, CA operations bypass the DMA packet FIFO buffer 906 and go directly to the output controller, which according to one embodiment of the present invention, comprises a bus arbitration unit 946 and an output sequencer 948.

When simultaneous requests occur between the three transmitter sources, arbitration logic provides prioritization between them. Highest priority is given to control actions (CA), followed by requested read DMA operations, and the lowest priority is given to processor initiated DMA operations.

The receiver portion of the bus interface 900 supports two modes of access from the system bus including reception of DMA requests and control actions. DMA operations are packet oriented with individual packets each initiating a DMA operation. The DMA operation, according to one embodiment of the present invention, initiated by each individual packet is to store four 64 bit data words into host processor memory. DMA operations apply to SW and QW operations. CA operations are single word packets that perform special functions such as interrupts and read requests. Each of these operations is handled differently. Interrupts, for example, according to one embodiment of the present invention, are buffered through a "16 deep" FIFO buffer with a status register, such as the interrupt FIFO buffer 908 shown in FIG. 9. Read requests, on the other hand, according to one embodiment of the present invention, are accepted one at a time and are sent to the transmitter section of the bus interface 900 for DMA processing.

Bus Gateway Devices

Bus gateway devices, according to one embodiment of the present invention, serve as bus repeaters that operate between the system bus and individual module buses. The system bus architecture allows for a single system wide bus called the system bus, such as the system bus 102 of FIG. 1, which is the primary backbone that interconnects all modules. It is also sometimes referred to as the backplane. The module bus is a local bus that is located on modules that support multiple processors that are required to be interconnected locally, such as module bus 122 shown in FIG. 1. A local bus segment is defined to be an interconnect for up to seven devices, of which the bus gateway is one. The system bus is a local bus segment with up to seven modules that can include bus gateways. The module bus is also a local bus segment that can support up to six devices and a bus gateway.

Local bus segments all operate in parallel with local arbitration and data transfers. This technique of operation is designed to support simultaneous transfer within multiple clusters of processors in an array, or processor module. It also serves to reduce the amount of CPUs that must contend for a local bus, and reduces the amount of data loading on that bus. Functions included in the bus gateway device include bus repeaters and buffers for each direction of transfer, module bus arbitration, and time-out logic with error reporting.

Figure 10:
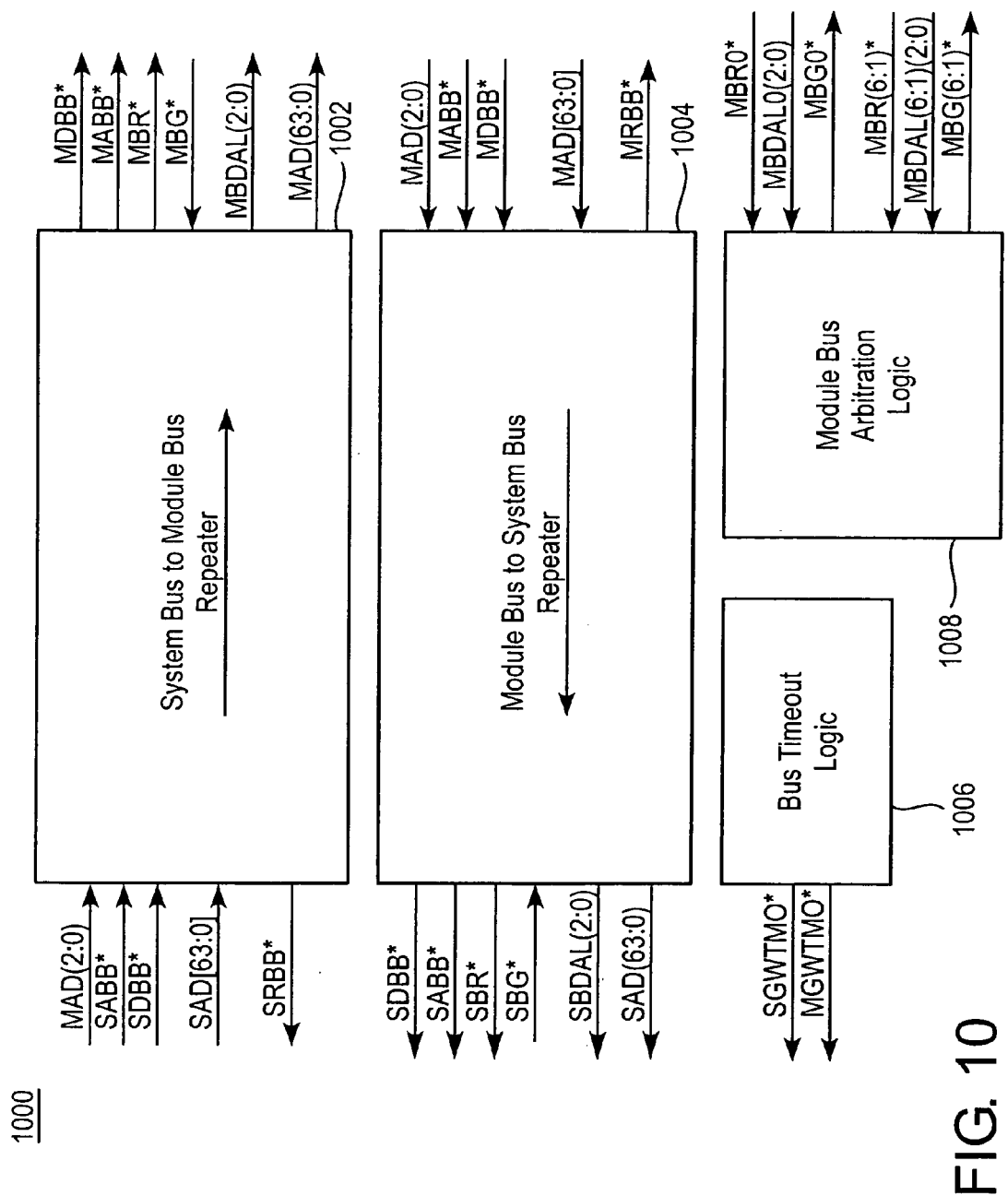
FIG. 10 is a block diagram illustrating an exemplary bus gateway of the present invention.

In FIG. 10, a block diagram 1000 of the bus gateway, wherein the bus gateway functions are carried out, is shown. The bus gateway device is fully synchronous and runs off a single system bus clock. A system bus to module bus repeater (STMBR) 1002 is provided to relay commands from the system bus, shown by arrows on the left-hand side of the repeater 1002 to the module bus, shown by arrows on the right-hand side of the repeater 1002. This bus gateway corresponds to the bus gateway 120 shown in FIG. 1, and the system bus and module bus according to one embodiment of the present invention corresponds to the system bus 102 and module bus 122 of FIG. 1. A module bus to system bus repeater (MTSBR) 1004 is provided to relay commands from the module bus, indicated by arrows on the right-hand side of the repeater 1004, to the system bus, indicated by the arrows on the left-hand side of the repeater 1004. Also provided is a bus time-out logic component 1006 which may issue the time-out signals as shown on the left-hand side of the device. These time-out signals may include a system bus gateway time-out (SGWTMO) signal and a module bus gateway time-out (MGWTMO) signal. Also provided within the gateway 1000 is a module bus arbitration logic device 1008, which interacts with various nodes within the module via the module bus, and arbitrates the passing of signals and communications on the module bus 122.

The bus repeaters STMBR 1002 and MTSBR 1004 are the main functional elements of the bus gateway. These two functional elements within the gateway each handle a separate direction, and are unidirectional. These repeaters 1002 and 1004 receive, buffer, and retransmit packets addressed to the other side of the gateway from which they came. In this manner, the system bus to module bus repeater (STMBR) 1002 relays commands from the system bus to the module bus, and the module bus to system bus repeater (MTSBR) relays commands from the module bus to the system bus through the gateway.

Figure 11:
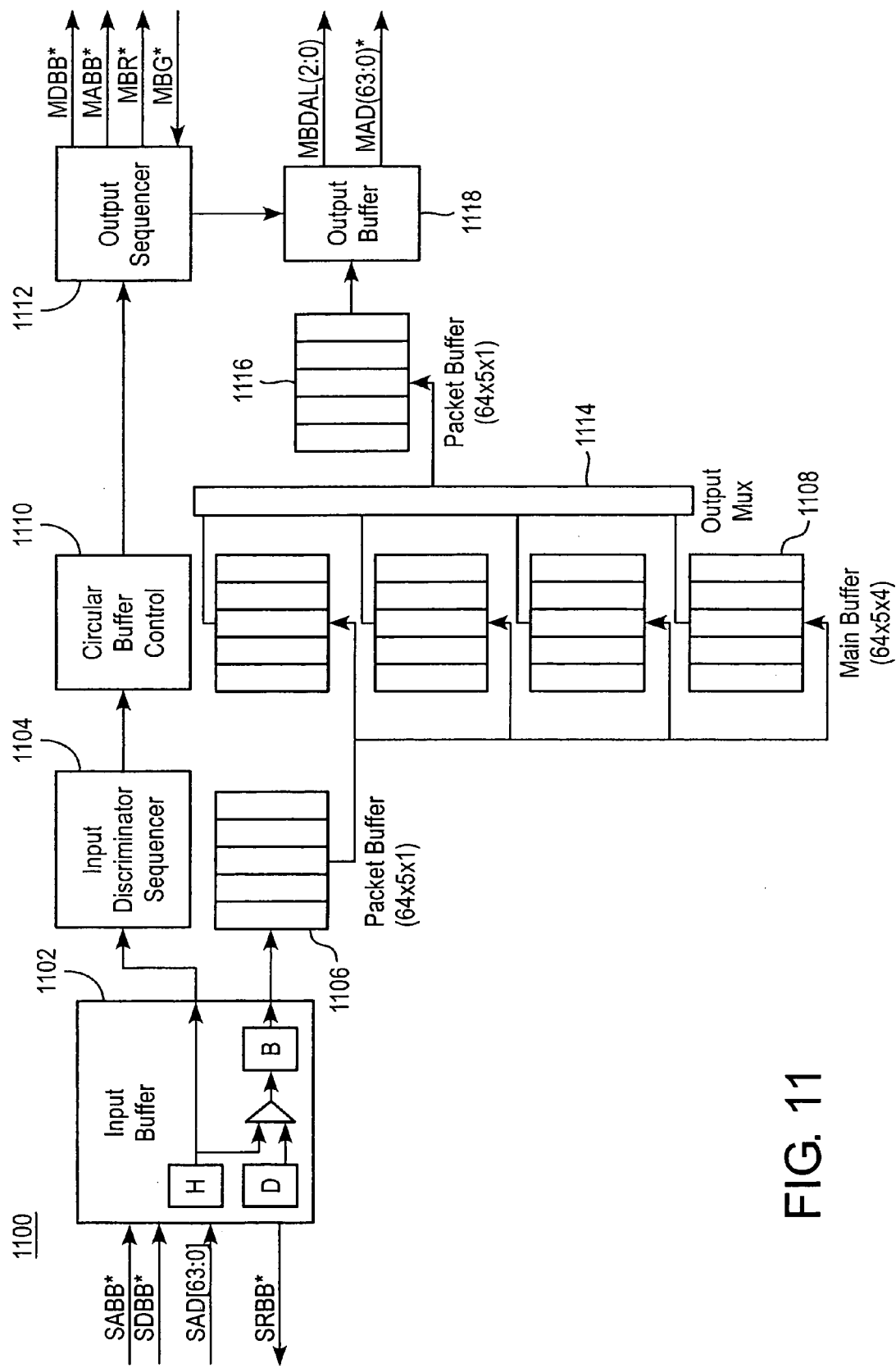
FIG. 11 is a block diagram illustrating an exemplary bus gateway-to-bus repeater configuration of the present invention.

In FIG. 11, a block diagram 1100 of the STMBR is illustrated. It should be noted, that the function of the MTSBR is essentially the same with the exception of differences in signal naming convention for input and output signals and the module/address sensitivity of the input discrimination sequencer.

In FIG. 11, the bus gateway STMBR uses an input buffer 1102 to perform an input latching function. The input latching function performed by the input buffer 1102 latches up the header and first data word received, and feeds the header to the input discriminator logic, or input discriminator sequencer 1104. The letter "H" stands for header, "D" for data requests, and "B" for buffer register. The input buffer 1102 stores the header, which is latched up in the buffer during the clock cycles required for the input discriminator sequencer 1104 to determine whether or not to receive the data packet based on the address information contained in its header. The input buffer 1102 thereby prevents the loss of data while the input discriminator sequencer 1104 determines whether or not to receive the data packet by analyzing its address.

The input discriminator sequencer 1104 checks the packet address to determine if the packet should be repeated to the other side. For operations transmitted from the system bus, in the case of an STMBR, the packet is received if the module address in the header matches that of the local module. In the case of an MTSBR, packets are received from the module bus if the module address in the header is not equal to that of the local module address.

Once the packet has been accepted by the STMBR 1100, the packet is rooted into the input packet buffer 1106 by shifting a number of words from the input buffer. In accordance with one embodiment of the present invention, two to five words are shifted from the input buffer when a packet is rooted to the input packet buffer 1106. In this embodiment, the input buffer does not hold a whole packet but has three registers that give the input discriminator sequencer 1104 enough time to decide if the packet is to be stored. Any packets received and approved of for storage by the input discriminator sequencer 1104 are then shifted, one packet at a time, per clock cycle, into the main buffer 1108. The main buffer 1108 uses rotating pointers to store the packets in a rotating fashion as controlled by the circular buffer control 1110, and output multiplexes 1114, set to indicate to the output sequencer 1112 that data is available. The output sequencer 1112 also maintains rotating pointers that are synchronized with and follow the main buffer 1108 storage pointers. These are used to extract the correct data through the output 1114 into the packet buffer 1116 and finally into the output buffer 1118 which is controlled by the output sequencer 1112. Once the data has been extracted, a flag is set to notify the input controller to free up a particular packet register for another packet.

If the packet buffer becomes nearly full, then a busy flag is sent back to the input bus, illustrated by the receiver busy bit signal SRBB* on the left-hand side of the input buffer 1102. This busy signal communicates to the bus arbitration unit to stop future transmissions. In such a case, a full main buffer 1108 is drained as the input pipeline is stopped. Once enough packets have been read out of the main buffer 1108 and pipeline operation can resume, the busy signal SRBB* will be negated.

The output sequencer 1112, according to one embodiment of the present invention will perform a parallel transfer of a packet during one clock cycle from the main buffer to the output packet buffer when it has been notified of one or more available packets. Subsequently, the output sequencer 1112 will issue a bus request (BR) along with the destination module or device address. Upon receiving acknowledgment, the output sequencer 1112 will begin shifting the header and the appropriate number of data words onto the output bus. If another packet is available, it will initiate another bus request while the current one is being transmitted along with the destination address of the next packet. The repeated function of the data pipeline must be capable of operating without any stalls other than when the bus and/or destination are not available, and when the busy flag is set.

Arbitration Logic

Arbitration logic, according to one embodiment of the present invention, controls access to the module bus from the bus gateway, such as the bus gateway 120 shown in FIG. 1, and other devices on the module bus. It receives bus requests (BR) from each of the module bus devices, including, for example, the STMBR in the gateway. Destination device addresses being requested are also received by the arbitration logic. The arbitration logic then prioritizes the requests according to a modified rotating priority scheme and grants access to the bus accordingly. One example of such a rotating priority scheme used in one embodiment of the present invention is a round-robin-type of rotating priority scheme. Messages to be transmitted to module devices on the module bus include a module bus destination address line (MBDAL). This MBDAL, however, does not indicate which module is being accessed, or that the access is on or off the current module associated with the module bus. For example, a module device address of 0 indicates that the gateway is being referenced. However, an operation addressed in this manner has no meaning, as a destination device address is necessary for transfers between multiple temporal processor (TP) modules.

To remedy problems in accessing devices in different TPs, the bus interface may perform a comparison of the device address in the requesting header with its local module address. If it is detected that these two addresses are not equal, then the access requested is in a different module, and the MBDAL signal is set to indicate the particular destination device to be accessed. The destination device may be accessed by allowing a packet be sent to the gateway and repeated to another gateway, potentially of another, separate TP module. Therefore, according to one embodiment of the present invention, the module device address 0 contained within an MBDAL signal indicates that a module address has been selected in a different TP, thereby eliminating the need for additional signals to the bus gateway unit.

Time-Out Function

The gateway time-out function, associated with one embodiment of the present invention monitors both directions of data flow through the repeater. If a jam or substantial delay occurs, the gateway time-out function will halt bus traffic in a particular direction across the gateway, which will likely result in a loss of system function. A jam of this type can occur if the receiver is busy or is stuck, or when an illegal module or device address is referenced as a destination address.

Therefore, a 40 μs time-out limit is employed to break jams by dumping a packet which has been delayed in the gateway, and signaling an interrupt to the system controller. This packet that has been dumped will be lost, but data flow may be resumed until another packet causes a long delay, or becomes stuck. In cases involving DMA operations that have stalled packets, system performance often degrades to the point of failure.

In response to possible system failure, the system controller (SC) will be able to transmit the errors associated with such a failure. The SC will have knowledge of where the failure has occurred. For example, the SC will know which TP gateway has a delay, and in which direction the delayed request was transmitted across the gateway. As a result, the SC can determine the destination bus of the stalled packet. Therefore, the SC may generate the SGWTMO or MGWTMO errors according to the direction of flow of the packet that created a delay within the gateway to resolve the problem.

Clock Distribution

The system bus of the present invention is a fully synchronous bus system that supports high data rates. In accordance with one embodiment of the present invention, data transmission speeds of up to 128 Mb/s throughput may be sustained. It will be appreciated by those skilled in the art, however, that as processor and bus speed limitations are reduced, this rate may increase greatly, and is still within the scope of the present invention.

Figure 12:
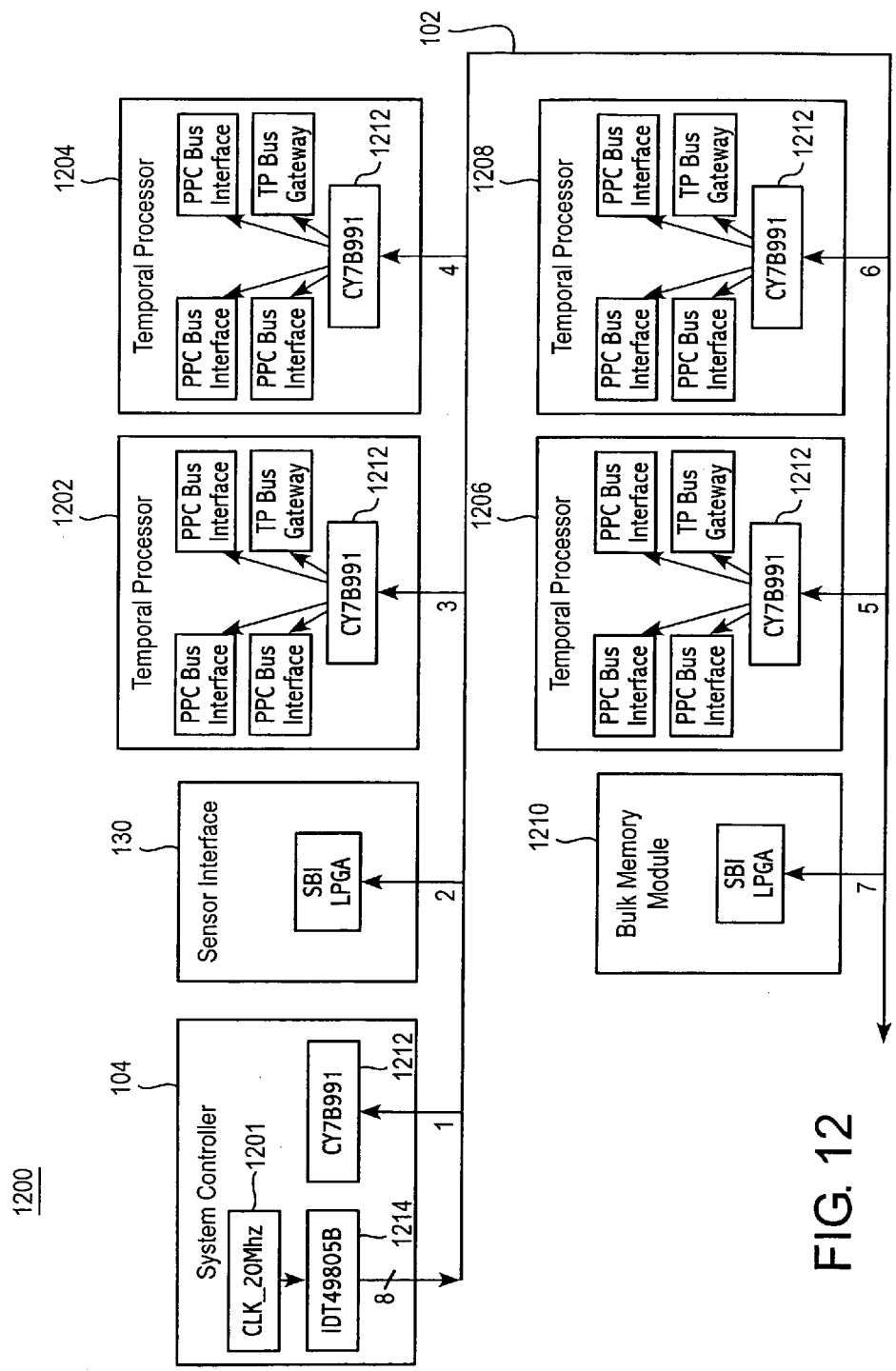
FIG. 12 is a block diagram illustrating an exemplary clock distribution on a system bus configuration.

The block diagram of the system 1200 in FIG. 12 illustrates the clock distribution of a system, such as the system 100 shown in FIG. 1. In FIG. 12, timing information is generated by the system clock 1201 and transmitted to a sensor interface 130, temporal processor modules 1202, 1204, 1206, 1208, and a bulk memory module 1210. The bulk memory module 1210 is a passive memory module with no processors, which may be optionally included in the system of the present invention.

Within each of the temporal processors 1202, 1204, 1206, 1208, and the system controller 104, is a zero-skew phase-locked-loop (PLL) element and several nodes including processors.

In accordance with one embodiment of the present invention, the components within each TP module are designed to run synchronously at 20 MHz. This is accomplished as the PLL element 1212 within each TP module is designed to generate outputs that are precisely synchronized to the clock signal transmissions from the transmission component 1214, thereby providing system synchrony between all devices on all bus levels. Those skilled in the art will appreciate that the two-tiered structure of the system 1200 of the present invention shown in FIG. 12 can run at much higher speeds, as processor speed limits, and bus speed limits are overcome due to new technologies, and other scientific advancements. Such speed increases are intended to be encompassed within the present invention, and require no additional experimentation to implement, but are apparent from the present invention. Furthermore, various part identification numbers and designations are given, such as PPC within the temporal processor modules indicating that a power PC processor is being used. It should be noted, however, that any suitable processor could be used within the temporal processors 1202, 1204, 1206, and 1208. Likewise, any suitable replacement parts could be interchanged with those shown in the block diagram of the system 1200 of FIG. 12, without departing from the spirit of the present invention.

Reset Signals

Two types of reset signals are supported on the system bus. These include hardware module reset signals and control transaction processor reset signals. The hardware module reset signals are discrete signals from the system controller (SC), and are buffered and controlled individually when transmitted to the various modules. These reset signals are outlined in Table 7 below.

TABLE 7

| Name | Function | Action | Type | M | D | D/L | TPD |
|---|---|---|---|---|---|---|---|
| RSTSI* | Reset Sensor Interface Module Hardware | 0-Assert Reset 1-Negate Reset | TTL | U | 0 | 1/2 | 25 |
| RSTCISP* | Reset CISP Subsystem | 0-Assert Reset 1-Negate Reset | TTL | U | 0 | 1/8 | 25 |
| RSTTPA* | Reset Temporal Processor A | 0-Assert Reset 1-Negate Reset | CMOS 3.3 V | U | 0 | 1/2 | 25 |
| RSTTPB* | Reset Temporal Processor B | 0-Assert Reset 1-Negate Reset | CMOS 3.3 V | U | 0 | 1/2 | 25 |
| RSTTPG* | Reset Temporal Processor Growth | 0-Assert Reset 1-Negate Reset | CMOS 3.3 V | U | 0 | 1/2 | 25 |
| RSTSPR* | Other Growth | 0-Assert Reset 1-Negate Reset | TTL | U | 0 | 1/2 | 25 |

The modes associated with each of the respective signals is indicated by the column denoted "M", wherein specific modes U and B indicate unidirectional and bidirectional signals, respectively. The column denoted "D" refers to the default state, while "D/L" refers to the number of maximum drivers over loads. The column denoted "TPD" indicates the total propagation delay between the source and destination in nanoseconds.

System Bus Signals

The various system bus requests executed on the system bus, such as the system bus 102 of FIG. 1, are outlined below in Table 8, for the sake of convenience. The last four columns express the same quantities associated with the last four columns in Table 7.

TABLE 8

| Name | Function | Action | Type | M | D | D/L | TPD |
|---|---|---|---|---|---|---|---|
| SBR(6:0)* | Bus Request | 0-Assert Rqst<br>1-Negate Rqst | CMOS<br>5 v | U | 0 | 1/1 | 25 |
| SBG(6:0)* | System Bus Grant | 0-Assert Grant<br>1-Negate Grant | CMOS<br>5 v | U | 0 | 1/1 | 25 |
| SAD(63:0) | Address/Data Bus | Header or Data Value | CMOS<br>5 v | B | 0 | 8/8 | 25 |
| SABB* | Address Bus Busy | 0-Assert Busy<br>1-Negate Busy | CMOS<br>5 v | U | 0 | 8/8 | 25 |
| SDBB* | Data Bus Busy | 0-Assert Busy<br>1-Negate Busy | CMOS<br>3.3 v | U | 0 | 8/8 | 25 |
| SBDAL0(2:0)<br>SBDAL1(2:0)<br>SBDAL2(2:0)<br>SBDAL3(2:0)<br>SBDAL4(2:0)<br>SBDAL5(2:0)<br>SBDAL6(2:0) | Bus Destination Address Lines, 3 per receiver* maximum 7 receivers gives 21 signals | Destination Address Value | CMOS<br>5 v | U | 0 | 1/1 | 25 |
| SRBB(6:0)* | Receiver Buffer Busy | 0-Busy<br>1-Available | CMOS<br>5 v | U | 0 | 1/1 | 25 |
| BDPRES(6:0)* | Board Present | 0-Present<br>1-Not Present | CMOS<br>5 v | U | 0 | 1/1 | 25 |

Module Bus Signals

The various system bus requests executed on the system bus, such as the system bus 102 of FIG. 1, are outlined below in Table 9, for the sake of convenience. The last four columns express the same quantities associated with the last four columns in Table 7.

TABLE 9

| Name | Function | Action | Type | M | D | D/L | TPD |
|---|---|---|---|---|---|---|---|
| MBR(6:0)* | Bus Request | 0-Assert Rqst<br>1-Negate Rqst | CMOS<br>5 v | U | 0 | 1/1 | 25 |
| MBG(6:0)* | System Bus Grant | 0-Assert Grant<br>1-Negate Grant | CMOS<br>5 v | U | 0 | 1/1 | 25 |
| MAD(63:0) | Address/Data Bus | Header or Data Value | CMOS<br>5 v | B | 0 | 8/8 | 25 |
| MABB* | Address Bus Busy | 0-Assert Busy<br>1-Negate Busy | CMOS<br>5 v | U | 0 | 8/8 | 25 |
| MDBB* | Data Bus Busy | 0-Assert Busy<br>1-Negate Busy | CMOS<br>5 v | U | 0 | 8/8 | 25 |
| MBDAL0(2:0)<br>MBDAL1(2:0)<br>MBDAL2(2:0)<br>MBDAL3(2:0)<br>MBDAL4(2:0)<br>MBDAL5(2:0)<br>MBDAL6(2:0) | Bus Destination Address Lines, 3 per receiver* maximum 7 receivers gives 21 signals | Destination Address Value | CMOS<br>5 v | U | 0 | 1/1 | 25 |
| MRBB(6:0)* | Receiver Buffer Busy | 0-Busy<br>[00178]<br>1-Available | CMOS<br>5 v | U | 0 | 1/1 | 25 |
| DVPRES(6:0)* | Device Present | 0-Present<br>1-Not Present | CMOS<br>5 v | U | 0 | 1/1 | 25 |

Module Address Assignments

Table 10 below outlines the module address assignments for the processor system of the present invention. These values are listed in table format for the sake of convenience.

TABLE 10

| MAD | Module | Description |
|---|---|---|
| 0 | SC | System Controller/Bus Controller |
| 1 | SI | Sensor Interface |
| 2 | BM | Byte Memory Module |
| 3 | TPA | Temporal Processor A |
| 4 | TPB | Temporal Processor B |
| 5 | TPC | Temporal Processor C |
| 6 | TPG | Growth Temporal Processor |
| 7 | BCAST | Broadcast Address |

TPA Device Address Assignments

Table 11 below outlines the TPA device address assignments for the processor subsystem. These values are listed in table format for the sake of convenience.

TABLE 11

| DDA/SDA | Module | Description |
| --- | --- | --- |
| 0 | BG | Bus Gateway |
| 1 | PPC1 | PPC CPU 1 |
| 2 | PPC2 | PPC CPU 2 |
| 3 | PPC3 | PPC CPU 3 |
| 4 | PPP4 | PPC CPU 4 |
| 5–6 | (spare) | |
| 7 | BCAST | Broadcast Address |

From the foregoing, it can be seen that the present invention provides a two-level, multi-tier system bus. Such a system has many advantages as outlined herein. The preferred embodiment of the present invention is directed toward a system that utilizes a system bus for accessing multiple modules each containing individual module buses, which each have multiple branches containing separate nodes with individual processors. In this manner, the present invention may access multiple, interconnected processors without long delays due to bus information traffic. It is anticipated, that the processor speeds and types available, along with bus speeds and types will improve due to engineering and scientific advancements, such as material advancements, for example. The present invention may be utilized by incorporating different data packet sizes and such advancements as advancements in processor speeds and bus traffic speeds, and is fully intended to embrace such advancements.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range of equivalents thereof are intended to be embraced therein.

What is claimed is:

1. Apparatus for managing flow of information among plural processors of a processing array, comprising:
    a plurality of processors, each processor being in communication with a respective local processor bus;
    a system bus for interconnecting at least two processors and providing a path for packets of data and control information, control information packets being separately buffered from other packets in a buffer separately connected between the respective local processor bus and the system bus; and
    means for arbitrating access to at least a first portion of the system bus among said at least two processors to transfer said packets of data and control information over said first portion, said means for arbitrating establishing a clear path to a destination device by checking device busy signals to ensure that the destination device is not busy, and said packets being transferred using a protocol by which the system bus performs control actions for system bus access independently of said at least two processors.

2. The apparatus of claim 1, comprising:
    at least one module connected by said system bus to said means for arbitrating.

3. The apparatus of claim 2, wherein said at least one module comprises a gateway device for communicating via said system bus to said means for arbitration.

4. The apparatus of claim 3, wherein said at least one module comprises a module bus for administering to at least one module node within said at least one module.

5. The apparatus of claim 4, wherein said at least one module node comprises a processing device.

6. The apparatus of claim 5, wherein said at least one module node comprises a bus interface device for achieving data communication between said processing device and said module bus.

7. The apparatus of claim 6, wherein said at least one module comprises a local processor bus for communicating data between said processing device and said bus interface device.

8. The apparatus of claim 1, comprising:
    a sensor interface connected to said system bus.

9. The apparatus of claim 8, wherein said sensor interface comprises a processor for processing sensor data.

10. The apparatus of claim 9, wherein said sensor interface comprises a bus interface device for communicating data between said processor and said system bus.

11. The apparatus of claim 10, wherein said sensor interface comprises a local processor bus for communicating data between said processor and said bus interface device.

12. The apparatus of claim 8, wherein said sensor interface comprises a video sensor interface.

13. The apparatus of claim 8, wherein said sensor interface comprises a forward looking infrared (FLIR) sensor interface.

14. The apparatus of claim 1, comprising a system controller for controlling access to the system bus.

15. The apparatus of claim 14, wherein said system controller comprises a system bus arbitration unit for controlling access to the system bus.

16. The apparatus of claim 14, wherein said system controller comprises a processor connected to a bus interface device, which is connected to the system bus.

17. A method for managing flow of information among plural processors of a processing array, comprising the steps of:
    providing a local connection by a local processor bus for each of a plurality of processors;
    interconnecting at least two processors for providing a path for packets of data and control information by a system bus, control information packets being separately buffered from other packets in a buffer separately connected between the respective local processor bus and the system bus; and
    arbitrating access to at least a first portion of a system bus among said at least two processors to transfer said packets of data and control information over said first portion, said packets being transferred using a protocol by which a system bus performs control actions for system bus access independently of said at least two processors, wherein arbitrating access comprises establishing a clear path to a destination device by checking device busy signals to ensure that the destination device is not busy.

18. The method of claim 17, comprising the step of:
    interconnecting at least one module with said system bus by way of a bus gateway device, said at least one module comprising said bus gateway device, a module bus, at least one processor, and at least one bus interface device for connecting said at least one processor to said module bus.

19. The method of claim 18, wherein said step of arbitrating comprises the steps of:
  requesting a bus grant to transmit data packets to said device;
  receiving a bus grant signal in response to said step of requesting, indicating that data may be transmitted over the system bus; and
  transmitting data packets in response to said step of receiving.

20. The method of claim 19, wherein said steps of requesting and receiving are accomplished by a device connected to the system bus.

21. The method of claim 20, wherein said bus grant signal is issued by a system bus arbitration unit.

22. The method of claim 17, wherein said step of arbitrating comprises the steps of:
  inquiring if the system bus is in use;
  verifying that a destination device is not busy once the system bus is not in use;
  requesting access to the system bus to a system bus arbitration unit;
  gaining access to the system bus from said system bus arbitration unit; and
  transmitting data packets to said destination device.

23. The method of claim 22, wherein the system bus arbitration unit allows continual access to the system bus if the destination device does not become busy, if the bus does not become busy, and if no other device requests access to the system bus.

24. The method of claim 23, wherein the system bus arbitration unit grants access to a second device upon request during a transmission of a data packet by another device on the system bus.

25. The method of claim 24, wherein access to the system bus is granted to a second device by the system bus arbitration unit, which executes the steps of:
  discontinuing bus grant access to any device currently transmitting data;
  verifying that the system bus is not busy;
  verifying that a destination device is not busy;
  granting access to the system bus for the second device requesting access;
  delaying any further transmission by said device whose access to the system bus was discontinued by said step of discontinuing until after at least one data packet has been transmitted by said second device.

26. The method of claim 25, wherein access to the system bus between multiple devices connected to the system bus is granted according to priority.

27. The method of claim 26, wherein access to the system bus between multiple devices connected to the system bus is granted in a rotating fashion based on said priority and for a maximum of time required to transfer one data packet.

28. The method of claim 17, wherein devices connected to the system bus contain local and module busses connected to the system bus by way of a gateway device, which arbitrates access to nodes connected to said module bus.

29. The method of claim 28, wherein said gateway device arbitrates access to the local and module busses according to priority.

30. The method of claim 29, wherein said gateway device arbitrates access to the local and module busses in a rotating fashion.

31. The method of claim 28, wherein arbitration of access to the module bus is accomplished by the following steps:
  inquiring if the module bus is in use;
  verifying that a destination processor is not busy once the module bus is not in use;
  requesting access to the module bus to a bus gateway device;
  gaining access to the module bus from said bus gateway device; and
  transmitting data packets to said destination processor.

* * * * *